US012445962B2

(12) United States Patent
Koch

(10) Patent No.: US 12,445,962 B2
(45) Date of Patent: Oct. 14, 2025

(54) MACHINE LEARNING FOR IMPROVED POWER SOURCE LONGEVITY FOR A DEVICE

(71) Applicant: Medtronic, Inc., Minneapolis, MN (US)

(72) Inventor: Christopher D. Koch, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 399 days.

(21) Appl. No.: 17/819,494

(22) Filed: Aug. 12, 2022

(65) Prior Publication Data

US 2023/0061161 A1 Mar. 2, 2023

Related U.S. Application Data

(60) Provisional application No. 63/236,835, filed on Aug. 25, 2021.

(51) Int. Cl.
| | |
|---|---|
| *H04W 76/23* | (2018.01) |
| *G06N 20/00* | (2019.01) |
| *H04W 8/00* | (2009.01) |
| *H04W 24/08* | (2009.01) |
| *H04W 52/02* | (2009.01) |
| *A61N 1/372* | (2006.01) |

(52) U.S. Cl.
CPC ........ *H04W 52/0225* (2013.01); *G06N 20/00* (2019.01); *H04W 8/005* (2013.01); *A61N 1/37252* (2013.01)

(58) Field of Classification Search
None
See application file for complete search history.

(56) References Cited

U.S. PATENT DOCUMENTS

| | | | |
|---|---|---|---|
| 9,501,745 B2 | 11/2016 | Nitz et al. | |
| 10,163,058 B2 | 12/2018 | Nitz et al. | |
| 10,517,134 B2 | 12/2019 | Oza et al. | |
| 10,785,720 B2 | 9/2020 | Li et al. | |
| 11,007,370 B2 | 5/2021 | Shahandeh et al. | |
| 2014/0154987 A1* | 6/2014 | Lee | H04W 4/80 455/41.2 |
| 2018/0243567 A1 | 8/2018 | St. Martin et al. | |
| 2018/0332653 A1* | 11/2018 | Oza | G16H 40/67 |

(Continued)

OTHER PUBLICATIONS

International Search Report and Written Opinion of International Application No. PCT/IB2022/057930, dated Nov. 10, 2022, 8 pp.

*Primary Examiner* — Gary Lafontant
(74) *Attorney, Agent, or Firm* — Shumaker & Sieffert, P.A.

(57) ABSTRACT

This disclosure describes systems, devices and techniques for improving the longevity of battery life in a second device. An example first device includes communication circuitry configured to communicate with the second device and one or more sensors configured to sense parameters associated with the first device. The first device includes processing circuitry configured to determine a first time period when a likelihood of successful communications with the second device is higher than a second time period based on the sensed parameters, and control the communication circuitry to communicate with the second device during the first time period and refrain from communicating with the second device during the second time period.

16 Claims, 8 Drawing Sheets

(56) References Cited

U.S. PATENT DOCUMENTS

| | | |
|---|---|---|
| 2020/0129773 A1 | 4/2020 | Eisele et al. |
| 2020/0205081 A1 | 6/2020 | Garg et al. |
| 2020/0352441 A1 | 11/2020 | Soykan et al. |
| 2020/0357517 A1 | 11/2020 | Haddad et al. |
| 2020/0357519 A1 | 11/2020 | Chakravarthy et al. |
| 2023/0125734 A1* | 4/2023 | Hirai .................... G16H 50/30 705/3 |

\* cited by examiner

MACHINE LEARNING FOR IMPROVED POWER SOURCE LONGEVITY FOR A DEVICE

This application claims priority to U.S. Provisional Application No. 63/236,835, filed Aug. 25, 2021, the entire content of which is incorporated by reference herein.

TECHNICAL FIELD

The disclosure relates generally to devices and device systems and, more particularly, to improving longevity of power sources for devices or improving the likelihood of successful communication between devices, such as medical devices.

BACKGROUND

Some types of medical devices may be used to monitor one or more physiological parameters of a patient. In addition to or instead of monitoring one or more physiological parameters of a patent, some medical devices may be used to provide therapy to a patient. Such medical devices may include, or may be part of a system that includes, sensors that detect signals associated with physiological parameters. Values determined based on such signals may be used to assist in detecting changes in patient conditions, in evaluating the efficacy of a therapy, or in generally evaluating patient health. Such medical devices may be implantable or external to the patient and be powered by a battery.

SUMMARY

In general, the disclosure describes techniques for improving the longevity of power sources for devices, or improving the likelihood for successful communication between devices. These techniques may be applicable to external devices or implantable medical devices (IMDs). For example, the techniques described herein may extend a battery life of a battery powering a device or increase a likelihood of successful communications between devices. While the techniques of this disclosure are primarily described with respect to IMDs and external devices, the techniques may be used with any devices powered by a power source, such as a battery.

These such as implantable medical devices (IMDs). For example, the techniques described herein may extend a battery life of a battery powering a device. While the techniques of this disclosure are primarily described with respect to IMDs and external devices, the techniques may be used with any devices powered by a power source, such as a battery.

Because the IMD is implanted within the patient, a clinician or a patient uses an external device to configure or control the monitoring and/or therapy provided by the IMD over a wireless connection. These external devices may also be referred to as programmers or monitors. One type of external device which may be used with an IMD is mobile device, such as a cellular phone (e.g., a smart phone), a satellite phone, a tablet, a wearable device, or the like. Another type of external devices may include devices that are intended to remain stationary, such as a dedicated bed-side monitor, a desktop computer, a server, or the like.

An IMD may wirelessly advertise for communication to the external device at predetermined intervals. The external device may initiate communication with the IMD in response to receiving an advertisement. The external device may then transmit one or more instructions to the IMD. For example, the external device may transmit an instruction for the IMD to transmit data to the external device. When the IMD is advertising for communication or transmitting data to the external device, the power source of the IMD (e.g., a battery) is being drained by the wireless radio within the IMD. Some IMDs contain limited and fixed capacity, non-rechargeable batteries, while other IMDs contain rechargeable batteries.

The techniques described herein may improve the likelihood that any such communication may be successful with either type of external device by identifying time periods with relatively higher likelihood of successful communication based on sensed parameters. A successful communication may be one in which all data intended to be exchanged during the communication session is exchanged. Improving the likelihood that a communication is successful may reduce the number of times the same data is transmitted by the IMD. For an IMD having a non-rechargeable battery, improving the likelihood that a communication is successful may extend the overall life of the IMD which may reduce a need for surgery to replace the IMD. For an IMD having a rechargeable battery, improving the likelihood that a communication is successful may extend the recharge interval leading to increased patient satisfaction and flexibility.

In some examples, a first device includes communication circuitry configured to communicate with a second device; one or more sensors configured to sense parameters associated with the first device; and processing circuitry configured to: determine a first time period when a likelihood of successful communications with the second device is higher than a second time period based on the sensed parameters; and control the communication circuitry to communicate with the second device during the first time period and refrain from communicating with the second device during the second time period.

In some examples, a method includes determining, by processing circuitry, a first time period when a likelihood of successful communications with a second device is higher than a second time period based on sensed parameters; and controlling, by the processing circuitry, communication circuitry to communicate with the second device during the first time period and refrain from communicating with the second device during the second time period.

In some examples, a non-transitory computer-readable medium includes instructions for causing one or more processors to: determine a first time period when a likelihood of successful communications with a second device is higher than a second time period based on sensed parameters; and control communication circuitry to communicate with the second device during the first time period and refrain from communicating with the second device during the second time period.

In some examples, a first device includes communication circuitry configured to communicate with a second device; one or more sensors configured to sense parameters associated with the first device; and processing circuitry configured to: determine a first time period when a likelihood of successful communications with the second device is higher than a second time period based on the sensed parameters; control the communication circuitry to advertise for communication during the first time period.

In some examples, a method includes determining, by processing circuitry, a first time period when a likelihood of successful communications with the second device is higher than a second time period based on the sensed parameters;

and controlling the communication circuitry to advertise for communication during the first time period.

In some examples, a non-transitory computer-readable medium includes instructions for causing one or more processors to: determine a first time period when a likelihood of successful communications with the second device is higher than a second time period based on the sensed parameters; and control the communication circuitry to advertise for communication during the first time period.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
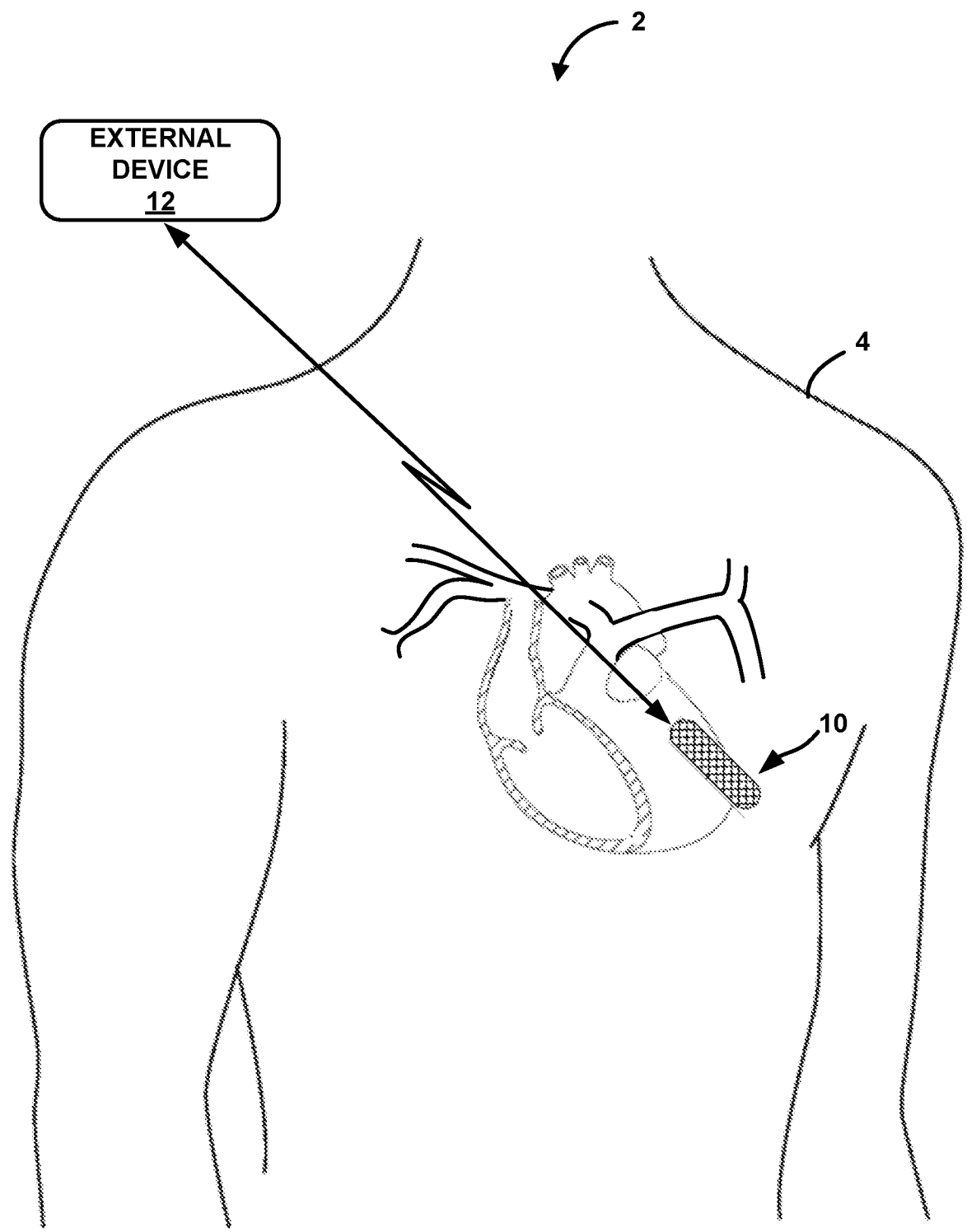
FIG. 1 illustrates the environment of an example medical device system in conjunction with a patient, in accordance with one or more techniques of this disclosure.

Various medical devices, including implantable medical devices (IMDs) such as insertable cardiac monitors, pacemakers, cardioverter-defibrillators, cardiac resynchronization devices, left ventricular assist device (LVAD), pulmonary artery pressure sensor, neurostimulators, spinal cord stimulators, drug pumps and other IMDs or wearable medical devices, and devices such as smart phones, blood pressure devices, scales to measure weight, hearing aids, pulse oximeters, cardiac monitoring patches, smart watches, fitness trackers, and other wearable devices, may include sensors which may sense vital physiological parameters of a patient and/or circuitry to provide therapy to the patient. Such medical devices may be configured to communicate with external computing devices through secure wireless communications technologies, such as personal area networking technologies like Bluetooth® or Bluetooth® low energy (BLE) wireless protocol. For example, a patient having such a medical device may be able to transmit and/or receive information relating to the operation of the IMD or to physiological parameters sensed by the IMD via such secure wireless communications technologies through the use of an external device. In some examples, the external device may be a mobile device, such as a cellular phone (e.g., a smart phone), a satellite phone, a tablet, a wearable device (e.g., a smart watch), a laptop computer, or the like. In other examples, the external device may be a more stationary device, such as a desktop computer, a dedicated bed-side monitor, a server, or the like.

The IMD may periodically, at a regular cadence, advertise, e.g., transmit a BLE advertisement, to the external device to begin a communications session if desired. For example, the external device may want to query the IMD for physiological parameters sensed by the IMD or to program the IMD. Additionally, the IMD may have data available for the external device to retrieve. The external device may scan for this advertisement.

The IMD may have limited battery resources that support both medical activities (e.g., monitoring physiological parameters of a patient, delivering stimulation to the patient (pacing, cardioversion/defibrillation or other stimulation), etc.), as well as the communications requirements with the external device. However, in a typical deployment, the IMD and the external device may physically separated beyond the communication range the devices for periods of time. For example, a patient having the IMD may leave the external device (e.g., their smart phone) in the car, and walk into their home, which is out of communication range of the external device. In scenarios like this, the IMD may advertise for communication, but there is no external device that engages with the IMD. In such cases, the advertisement for communication is unnecessary, and depletes power from the battery of the IMD in the patient. Additionally, if a communication session is initiated between the external device and the IMD and then the patient walks away from the external device, the communication session may time out and have to be reinitiated. This is also wasteful of power from the battery of the IMD. Therefore, it may be desirable to preserve battery capacity by having the IMD advertise for communication with the external device when the external device is more likely to be, and remain, physically in communication range of the IMD or to only initiate communication sessions between the external device and the IMD when the external device is more likely to be, and remain, physically in communication range of the IMD. This may increase the likelihood of successful communications between the IMD and the external device, e.g., where all data intended to be exchanged during a given communication session is exchanged. Additionally, it may increase the likelihood that data that is exchanged is not corrupted. Preserving battery capacity may extend the life of the IMD or increase the recharge interval of the IMD.

In some examples, the IMD may sense parameters indicative of a critical event, such as ventricular tachycardia, ventricular fibrillation, or myocardial infarction. In such cases, in some examples, the IMD may advertise for communication with the external device even if the likelihood of successful communication is low. In this manner, less important communications between the IMD and the external device may be postponed until the likelihood of successful communication is relatively higher, but more important communications may be attempted even during times when the likelihood of successful communication is relatively lower.

FIG. 1 illustrates the environment of an example medical device system 2 in conjunction with a patient 4, in accordance with one or more techniques of this disclosure. The example techniques may be used with an implantable medical device (IMD) 10, which may be in wireless communication with external device 12. In some examples, IMD 10 is implanted outside of a thoracic cavity of patient 4 (e.g., subcutaneously in the pectoral location illustrated in FIG. 1). IMD 10 may be positioned near the sternum near or just below the level of patient 4's heart, e.g., at least partially within the cardiac silhouette. In some examples, IMD 10 takes the form of a LINQ™ Insertable Cardiac Monitor (ICM), available from Medtronic plc, of Dublin, Ireland. The example techniques may additionally, or alternatively, be used with a medical device not illustrated in FIG. 1 such as another type of IMD.

Although in one example IMD 10 takes the form of an ICM, in other examples, IMD 10 takes the form of any combination of implantable cardiac devices (ICDs) with intravascular or extravascular leads, pacemakers, cardiac resynchronization therapy devices (CRT-Ds), neuromodulation devices, left ventricular assist devices (LVADs), implantable sensors, cardiac resynchronization therapy pacemakers (CRT-Ps), implantable pulse generators (IPGs), orthopedic devices, drug pumps, or other IMDs as examples. Moreover, techniques of this disclosure may be used reduce the battery drain of one or more of the aforementioned devices.

Clinicians sometimes diagnose a patient (e.g., patient 4) with medical conditions and/or determine whether a condition of patient 4 is improving or worsening based on one or more observed physiological signals collected by physiological sensors, such as electrodes, optical sensors, chemical sensors, temperature sensors, acoustic sensors, and motion sensors. In some cases, clinicians apply non-invasive sensors to patients in order to sense one or more physiological signals while a patent is in a clinic for a medical appointment. However, in some examples, events that may change a condition of a patient, such as administration of a therapy, may occur outside of the clinic. As such, in these examples, a clinician may be unable to observe the physiological markers needed to determine whether an event has changed a medical condition of the patient and/or determine whether a medical condition of the patient is improving or worsening while monitoring one or more physiological signals of the patient during a medical appointment. In the example illustrated in FIG. 1, IMD 10 is implanted within patient 4 to continuously record one or more physiological signals of patient 4 over an extended period of time.

In some examples, IMD 10 includes a plurality of electrodes. The plurality of electrodes is configured to detect signals that enable processing circuitry of IMD 10 to determine current values of additional parameters associated with the cardiac and/or lung functions of patient 4. In some examples, the plurality of electrodes of IMD 10 are configured to detect a signal indicative of an electric potential of the tissue surrounding the IMD 10. Moreover, IMD 10 may additionally or alternatively include one or more optical sensors, accelerometers, temperature sensors, chemical sensors, light sensors, pressure sensors, and acoustic sensors, in some examples. Such sensors may detect one or more physiological parameters indicative of a patient condition.

In some examples, external device 12 may be a hand-held computing device with a display viewable by the user and an interface for providing input to external device 12 (e.g., a user input mechanism). For example, external device 12 may include a small display screen (e.g., a liquid crystal display (LCD) or a light emitting diode (LED) display) that presents information to the user. In addition, external device 12 may include a touch screen display, keypad, buttons, a peripheral pointing device, voice activation, or another input mechanism that allows the user to navigate through the user interface of external device 12 and provide input. If external device 12 includes buttons and a keypad, the buttons may be dedicated to performing a certain function, e.g., a power button, the buttons and the keypad may be soft keys that change in function depending upon the section of the user interface currently viewed by the user, or any combination thereof. In some examples, external device 12 may be a mobile device, such as a cellular phone (e.g., a smart phone), a satellite phone, a tablet, or a wearable device (e.g., a smart watch).

When external device 12 is configured for use by the clinician, external device 12 may be used to transmit instructions to IMD 10. Example instructions may include requests to set electrode combinations for sensing and any other information that may be useful for programming into IMD 10. The clinician may also configure and store operational parameters for IMD 10 within 1 MB 10 with the aid of external device 12. In some examples, external device 12 assists the clinician in the configuration of IMD 10 by providing a system for identifying potentially beneficial operational parameter values.

Whether external device 12 is configured for clinician or patient use, external device 12 is configured to communicate with 1 MB 10 and, optionally, another computing device (not illustrated by FIG. 1), via wireless communication. External device 12, for example, may communicate via near-field communication technologies (e.g., inductive coupling, NFC or other communication technologies operable at ranges less than 10-20 cm) and far-field communication technologies (e.g., RF telemetry according to the 802.11 or Bluetooth®, BLE specification sets, or other communication technologies operable at ranges greater than near-field communication technologies). In some examples, external device 12 is configured to communicate with a computer network, such as the Medtronic CareLink® Network developed by Medtronic, plc, of Dublin, Ireland. For example, external device 12 may transmit data, such as data received from IMD 10, to another external device such as a smartphone, a tablet, or a desktop computer, and the other external device may in turn transmit the data to the computer network. In other examples, external device 12 may directly communicate with the computer network without an intermediary device.

Medical device system 2 of FIG. 1 is an example of a system configured to collect an electrogram (EGM) signal according to one or more techniques of this disclosure. In some examples, processing circuitry 14 includes EGM analysis circuitry configured to determine one or more parameters of an EGM signal of patient 4. In one example, an EGM signal is sensed via one or more electrodes of IMD 10. An EGM is a signal representative of electrical activity of the heart, measured by electrodes implanted within the body, and often within the heart itself. For example, a cardiac EGM may include P-waves (depolarization of the atria), R-waves (depolarization of the ventricles), and T-waves (repolarization of the ventricles), among other events. Information relating to the aforementioned events, such as time separating one or more of the events, may be applied for a number of purposes, such as to determine whether an arrhythmia is occurring and/or predict whether an arrhythmia is likely to occur. Cardiac signal analysis circuitry, which may be implemented as part of processing circuitry 14, may perform signal processing techniques to extract information indicating the one or more parameters of the cardiac signal.

In some examples, IMD 10 includes one or more accelerometers. An accelerometer of IMD 10 may collect an accelerometer signal which reflects a measurement of any one or more of a motion of patient 4, a posture of patient 4 and a body angle of patient 4. In some cases, the accelerometer may collect a three-axis accelerometer signal indicative of patient 4's movements within a three-dimensional Cartesian space. For example, the accelerometer signal may include a vertical axis accelerometer signal vector, a lateral axis accelerometer signal vector, and a frontal axis accelerometer signal vector. The vertical axis accelerometer signal vector may represent an acceleration of patient 4 along a vertical axis, the lateral axis accelerometer signal vector may represent an acceleration of patient 4 along a lateral axis, and the frontal axis accelerometer signal vector may represent an acceleration of patient 4 along a frontal axis. In some cases, the vertical axis substantially extends along a torso of patient 4 when patient 4 from a neck of patient 4 to a waist of patient 4, the lateral axis extends across a chest of patient 4 perpendicular to the vertical axis, and the frontal axis extends outward from and through the chest of patient 4, the frontal axis being perpendicular to the vertical axis and the lateral axis.

IMD 10 may measure a set of parameters including an impedance (e.g., subcutaneous impedance, an intrathoracic impedance or an intracardiac impedance) of patient 4, a respiratory rate of patient 4 during night hours, a respiratory rate of patient 4 during day hours, a heart rate of patient 4 during night hours, a heart rate of patient 4 during day hours, an atrial fibrillation (AF) burden of patient 4, a ventricular rate of patient 4 while patient 4 is experiencing AF, or other parameter or any combination thereof.

In some examples, one or more sensors (e.g., electrodes, motion sensors, optical sensors, temperature sensors, or any combination thereof) of IMD 10 may generate a signal that indicates a physiological parameter of a patient. In some examples, the signal that indicates the physiological parameter includes a plurality of parameter values, where each parameter value of the plurality of parameter values represents a measurement of the parameter at a respective interval of time. The plurality of parameter values may represent a sequence of parameter values, where each parameter value of the sequence of parameter values are collected by IMD 10 at a start of each time interval of a sequence of time intervals. For example, IMD 10 may perform a parameter measurement in order to determine a parameter value of the sequence of parameter values according to a recurring time interval (e.g., every day, every night, every other day, every twelve hours, every hour, or any other recurring time interval). In this way, IMD 10 may be configured to track a respective patient parameter more effectively as compared with a technique in which a patient parameter is tracked during patient visits to a clinic, since IMD 10 is implanted within patient 4 and is configured to perform parameter measurements according to recurring time intervals without missing a time interval or performing a parameter measurement off schedule.

As discussed above, IMD 10 may have limited battery resources and there may be time periods when IMD 10 and external device 12 are more likely to be within communication range of each other than other time periods. For example, there may be a time period where patient 4 may leave external device 12 in their car and walk into their home. In this case, if IMD 10 is advertising for communication with external device 12, external device 12 is likely out of communication range of IMD 10 and IMD 10 would be unnecessarily advertising for communication, placing a burden on the battery of IMD 10. Additionally, if during a communication session between external device 12 and IMD 10, patient 4 were to walk away from external device 12, the communication session may terminate prematurely, and data meant to be transferred between external device 12 and IMD 10 may have to be retransmitted. This also places a burden on the battery of IMD 10. The unnecessary advertising and retransmitting of data may shorten the life of an IMD having a non-rechargeable battery and shorten the recharge interval of an IMD having a rechargeable battery, neither of which is desirable.

As such, external device 12 may employ machine learning techniques to determine patterns of when external device 12 and IMD 10 may be more likely to be within communication range and when external device 12 and IMD 10 may be less likely to be within communication range. For example, external device 12 and/or IMD 10 may include sensors and may use parameters sensed using the sensors and times of day and/or days of the week associated therewith to train a machine learning algorithm. Based on the determined patterns, external device 12 may take action to reduce the power used by IMD 10 associated with communicating with external device 12.

While the techniques of this disclosure are primarily described with respect to external device 12, in some examples, IMD 10 may employ machine learning techniques, either on its own, or together with external device 12, to determine patterns of when external device 12 and IMD 10 may be more likely to be within communication range and when external device 12 and IMD 10 may be less likely to be within communication range. For example, IMD 10 and/or external device 12 may include sensors and may use parameters sensed using the sensors and times of day and/or days of the week associated therewith to train a machine learning algorithm. Based on the determined patterns, IMD 10 may take action to reduce the power used by IMD 10 associated with communicating with external device 12.

Several examples of potential sensed parameters and their relationship to whether or not external device 12 and IMD 10 are within communication range are now discussed. For example, external device 12 may sense advertisements from IMD 10. If external device 12 determines that external device 12 did not receive an expected advertisement from IMD 10, this may indicate that IMD 10 is out of communication range from external device 12, and therefore unlikely to achieve a successful communication session. If external device 12 determines that external device 12 did receive an expected advertisement from IMD 10, this may indicate that IMD 10 is within communication range of external device 12.

In the case where external device 12 is a smart phone, external device 12 may sense when patient 4 is using the smart phone, for example, taking or making a call, watching a video, surfing the Internet, playing a game, taking a photograph, or other interactions between patient 4 and external device 12 that indicate the external device 12 is near patient 4 and therefore in communication range of IMD 10. Likewise, external device 12 may sense when patient 4 is not using the smart phone which may be indicative of patient 4 not being near external device 12 and therefore less likely to be within communication range of IMD 10.

External device 12 may periodically or continuously sense whether there is movement of external device 12 through a motion sensor, such as an accelerometer. Movement of external device 12 may be indicative of external device 12 being in the possession of patient 4 and being more likely to be within communication range of IMD 10. When external device 12 is not moving, for example, this may be indicative of external device 12 not being in the possession of patient 4 and therefore less likely to be within communication range of IMD 10. In some examples, IMD 10 may also include a motion sensor. When both external device 12 and IMD 10 sense motion, this may be indicative of external device 12 being in the possession of patient 4 and being more likely to be within communication range of IMD 10. When one of external device 12 and IMD 10 senses motion and the other does not, this may be indicative of external device 12 not being in the possession of patient 4 and therefore less likely to be within communication range of IMD 10.

External device 12 may periodically or continuously sense ambient light levels through, for example, a camera sensor or an ambient light sensor. A very low level of ambient light during daylight hours may indicate that external device 12 is in a pocket of patient 4 or a purse of patient 4. This may be particularly true if external device 12 has such sensors on a front surface and a back surface. External device 12 being in a pocket or purse of patient 4 may be indicative of external device 12 being within communication range of IMD 10.

External device 12 may periodically or continuously sense ambient sound levels. Silence may be indicative of external device 12 being separated from patient 4 and being out of communication range from IMD 10, while ambient sounds may be indicative of external device 12 being near patient 4 and therefore within communication range of IMD 10.

External device 12 may periodically or continuously sense a geo-location of external device 12. For example, external device 12 may employ geo-fencing techniques or beacon techniques (e.g., locating wireless local area network beacons) to determine where external device 12 is located. For example, if external device 12 is located far from the home of patient 4, it may be indicative of external device 12 being with patient 4 and within communication range of IMD 10.

External device 12 may periodically or continuously sense an axis position of external device 12. For example, when patient 4 uses external device 12, the axis position of external device 12 may indicate external device 12 indicates external device 12 is vertical (e.g., external device 12 is upright) and being used by patient 4. This may be indicative of external device 12 being within communication range of IMD 10. When the axis position of external device 12 indicates external device 12 is horizontal (e.g., external device 12 is set down), this may be indicative of external device 12 not being used by patient 4 and being less likely to be in communication range of IMD 10 than when external device 12 is vertical.

External device 12 may use any of, or any combination of, such measures, or other sensed data, as input to a machine learning algorithm. The machine learning algorithm may learn patterns of the physical proximity of external device 12 to IMD 10, such as when there is a higher likelihood of successful communications (e.g., when IMD 10 is within communication range of external device 12) and when there is a lower likelihood of successful communications (e.g., when IMD 10 is outside of communication range of external device 12, when IMD 10 is within communication range of external device 12, but far enough away that a communication session may fail to support the complete transfer of data intended to be transferred, or when patient 4 is likely to move away from external device 12).

According to the techniques of this disclosure, external device 12 may machine learn a first time period when a likelihood of successful communications with IMD 10 is higher than a second time period based on sensed parameters. External device 12 may communicate with the IMD 10 during the first time period and refrain from communicating with the implanted medical device during the second time period. In this manner, IMD 10 may save battery power when IMD 10 is less likely to be able to successfully transmit data to external device 12 by not engaging in a communication session with external device 12 when the communication session is unlikely to be successful.

For example, a machine learning algorithm may determine a percentage likelihood that a communication session will be successful or that external device 12 and IMD 10 will be in communication range of each other during a communication session. External device 12 may compare the determined percentage to a predetermined likelihood threshold. If the determined percentage is greater or equal to the predetermined likelihood threshold, external device 12 may determine the associated time of day or day of the week to be within the first time period. If the determined percentage is less than the predetermined likelihood, external device 12 may determine the associated time of day or day of the week to be within the second time period. In another example, the machine learning algorithm may determine a ranked list of times of day or days of the week based on the likelihood that a communication session will be successful or that external device 12 and IMD 10 will be in communication range of each other during a communication session. In such a case, there may be more than a first time period and a second time period.

In some examples, external device 12 may implement the techniques of this disclosure in response to a charge level of a battery of IMD 10 or external device 12 falling below a predetermined charge threshold level. In this manner, external device 12 may not refrain from communicating with IMD 10 during the second time period until external device 12 receives an indication from IMD 10 that its battery charge level is below the predetermined battery charge threshold level or external device 12 determines that the battery charge level of external device 12 is below the battery charge threshold level. In some examples, there may be different battery charge threshold levels for IMD 10 and external device 12.

While the techniques of this disclosure are primarily described as being implemented by external device 12, in some examples the techniques of this disclosure may be implemented by IMD 10, another device, or any combination of such devices.

Figure 2:
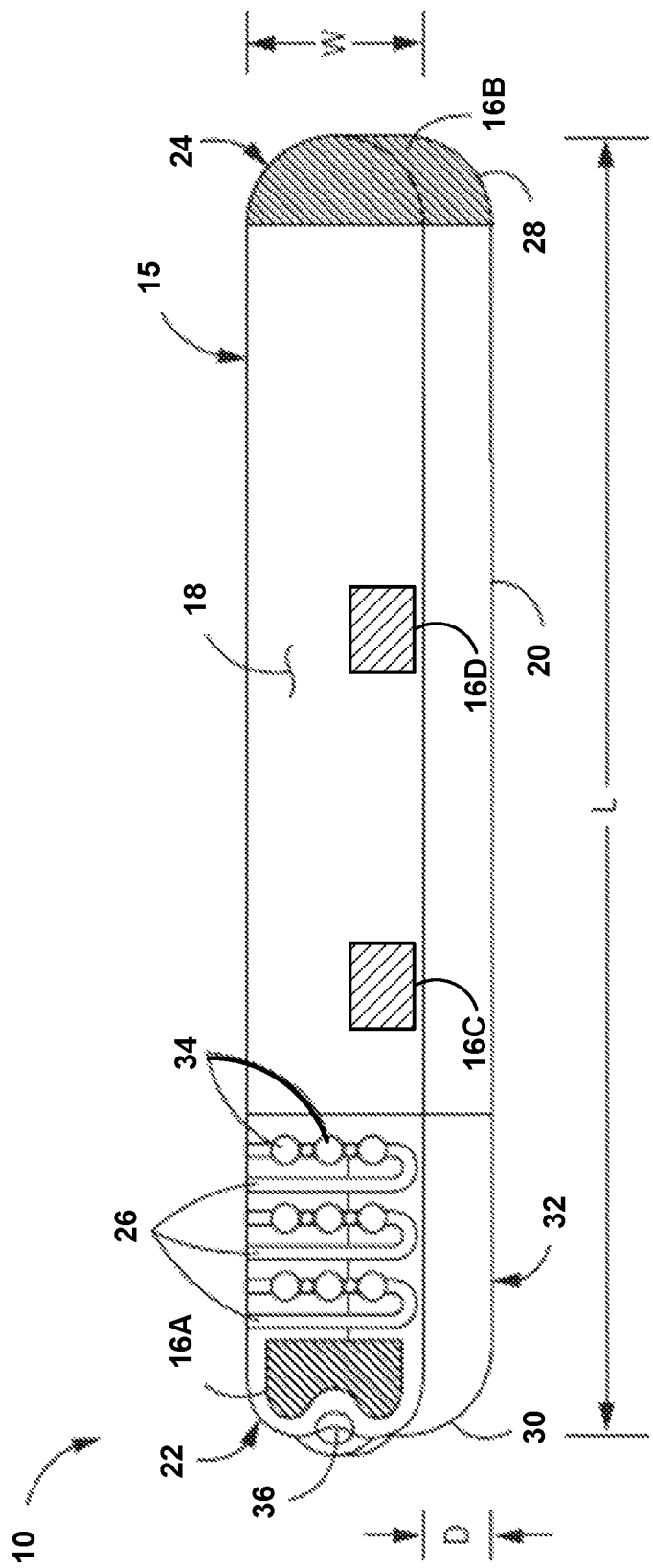
FIG. 2 is a conceptual drawing illustrating an example configuration of the implantable medical device (IMD) of the medical device system of FIG. 1, in accordance with one or more techniques described herein.

FIG. 2 is a conceptual drawing illustrating an example configuration of IMD 10 of the medical device system 2 of FIG. 1, in accordance with one or more techniques described herein. In the example shown in FIG. 2, IMD 10 may include a leadless, subcutaneously-implantable monitoring device having housing 15, proximal electrode 16A, and distal electrode 16B. Housing 15 may further include first major surface 18, second major surface 20, proximal end 22, and distal end 24. In some examples, IMD 10 may include one or more additional electrodes 16C, 16D positioned on one or both of major surfaces 18, 20 of IMD 10. Housing 15 encloses electronic circuitry located inside the IMD 10, and protects the circuitry contained therein from fluids such as body fluids. In some examples, electrical feedthroughs provide electrical connection of electrodes 16A-16D, and antenna 26, to circuitry within housing 15. In some examples, electrode 16B may be formed from an uninsulated portion of conductive housing 15.

In the example shown in FIG. 2, IMD 10 is defined by a length L, a width W, and thickness or depth D. In this example, IMD 10 is in the form of an elongated rectangular prism in which length L is significantly greater than width W, and in which width W is greater than depth D. However, other configurations of IMD 10 are contemplated, such as those in which the relative proportions of length L, width W, and depth D vary from those described and shown in FIG. 2. In some examples, the geometry of the IMD 10, such as the width W being greater than the depth D, may be selected to allow IMD 10 to be inserted under the skin of the patient using a minimally invasive procedure and to remain in the desired orientation during insertion. In addition, IMD 10 may include radial asymmetries (e.g., the rectangular shape) along a longitudinal axis of IMD 10, which may help maintain the device in a desired orientation following implantation.

In some examples, a spacing between proximal electrode 16A and distal electrode 16B may range from about 30-55 mm, about 35-55 mm, or about 40-55 mm, or more generally from about 25-60 mm. Overall, IMD 10 may have a length L of about 20-30 mm, about 40-60 mm, or about 45-60 mm. In some examples, the width W of major surface 18 may range from about 3-10 mm, and may be any single width or range of widths between about 3-10 mm. In some examples, a depth D of IMD 10 may range from about 2-9 mm. In other examples, the depth D of IMD 10 may range from about 2-5 mm, and may be any single or range of depths from about 2-9 mm. In any such examples, IMD 10 is sufficiently compact to be implanted within the subcutaneous space of patient 4 in the region of a pectoral muscle.

IMD 10, according to an example of the present disclosure, may have a geometry and size designed for ease of implant and patient comfort. Examples of IMD 10 described in this disclosure may have a volume of 3 cubic centimeters ($cm^3$) or less, 1.5 $cm^3$ or less, or any volume therebetween. In addition, in the example shown in FIG. 2, proximal end 22 and distal end 24 are rounded to reduce discomfort and irritation to surrounding tissue once implanted under the skin of patient 4.

In the example shown in FIG. 2, first major surface 18 of IMD 10 faces outward towards the skin, when IMD 10 is inserted within patient 4, whereas second major surface 20 is faces inward toward musculature of patient 4. Thus, first and second major surfaces 18, 20 may face in directions along a sagittal axis of patient 4 (see FIG. 1), and this orientation may be maintained upon implantation due to the dimensions of IMD 10.

Proximal electrode 16A and distal electrode 16B may be used to sense cardiac EGM signals (e.g., electrocardiogram (ECG) signals) when IMD 10 is implanted subcutaneously in patient 4. In some examples, processing circuitry of IMD 10 also may determine whether cardiac ECG signals of patient 4 are indicative of arrhythmia or other abnormalities, which processing circuitry of IMD 10 may evaluate in determining whether a medical condition (e.g., heart failure, sleep apnea, or COPD) of patient 4 has changed. The cardiac ECG signals may be stored in a memory of the IMD 10, and data derived from the cardiac ECG signals may be transmitted via integrated antenna 26 to another medical device, such as external device 12. In some examples, one or both of electrodes 16A and 16B also may be used by IMD 10 to detect impedance values during impedance measurements performed by IMD 10. In some examples, such impedance values detected by IMD 10 may reflect a resistance value associated with a contact between electrodes 16A, 16B, and target tissue of patient 4. Additionally, in some examples, electrodes 16A, 16B may be used by communication circuitry of IMD 10 for tissue conductance communication (TCC) communication with external device 12 or another device.

In the example shown in FIG. 2, proximal electrode 16A is in close proximity to proximal end 22, and distal electrode 16B is in close proximity to distal end 24 of IMD 10. In this example, distal electrode 16B is not limited to a flattened, outward facing surface, but may extend from first major surface 18, around rounded edges 28 or end surface 30, and onto the second major surface 20 in a three-dimensional curved configuration. As illustrated, proximal electrode 16A is located on first major surface 18 and is substantially flat and outward facing. However, in other examples not shown here, proximal electrode 16A and distal electrode 16B both may be configured like proximal electrode 16A shown in FIG. 2, or both may be configured like distal electrode 16B shown in FIG. 2. In some examples, additional electrodes 16C and 16D may be positioned on one or both of first major surface 18 and second major surface 20, such that a total of four electrodes are included on IMD 10. Any of electrodes 16A-16D may be formed of a biocompatible conductive material. For example, any of electrodes 16A-16D may be formed from any of stainless steel, titanium, platinum, iridium, or alloys thereof. In addition, electrodes of IMD 10 may be coated with a material such as titanium nitride or fractal titanium nitride, although other suitable materials and coatings for such electrodes may be used.

In the example shown in FIG. 2, proximal end 22 of IMD 10 includes header assembly 32 having one or more of proximal electrode 16A, integrated antenna 26, anti-migration projections 34, and suture hole 36. Integrated antenna 26 is located on the same major surface (e.g., first major surface 18) as proximal electrode 16A, and may be an integral part of header assembly 32. In other examples, integrated antenna 26 may be formed on the major surface opposite from proximal electrode 16A, or, in still other examples, may be incorporated within housing 15 of IMD 10. Antenna 26 may be configured to transmit or receive electromagnetic signals for communication. For example, antenna 26 may be configured to transmit to or receive signals from a programmer via inductive coupling, electromagnetic coupling, tissue conductance, Near Field Communication (NFC), Radio Frequency Identification (RFID), Bluetooth®, BLE, Wi-Fi®, or other proprietary or non-proprietary wireless telemetry communication schemes. Antenna 26 may be coupled to communication circuitry of IMD 10, which may drive antenna 26 to transmit signals to external device 12 and may transmit signals received from external device 12 to processing circuitry of IMD 10 via communication circuitry.

IMD 10 may include several features for retaining IMD 10 in position once subcutaneously implanted in patient 4. For example, as shown in FIG. 2, housing 15 may include anti-migration projections 34 positioned adjacent integrated antenna 26. Anti-migration projections 34 may include a plurality of bumps or protrusions extending away from first major surface 18 and may help prevent longitudinal movement of IMD 10 after implantation in patient 4. In other examples, anti-migration projections 34 may be located on the opposite major surface as proximal electrode 16A and/or integrated antenna 26. In addition, in the example shown in FIG. 2 header assembly 32 includes suture hole 36, which provides another means of securing IMD 10 to the patient to prevent movement following insertion. In the example shown, suture hole 36 is located adjacent to proximal electrode 16A. In some examples, header assembly 32 may include a molded header assembly made from a polymeric or plastic material, which may be integrated or separable from the main portion of IMD 10.

Electrodes 16A and 16B may be used to sense cardiac ECG signals, as described above. Additional electrodes 16C and 16D may be used to sense subcutaneous tissue impedance, in addition to or instead of electrodes 16A, 16B, in some examples. In some examples, processing circuitry of IMD 10 may determine an impedance value of patient 4 based on signals received from at least two of electrodes 16A-16D. For example, processing circuitry of IMD 10 may generate one of a current or voltage signal, deliver the signal via a selected two or more of electrodes 16A-16D, and measure the resulting other of current or voltage. Processing circuitry of IMD 10 may determine an impedance value based on the delivered current or voltage and the measured voltage or current.

In some examples, IMD 10 may include one or more additional sensors, such as one or more accelerometers (not shown) and/or one or more light sensors (not shown). Such accelerometers may be 3D accelerometers configured to generate signals indicative of one or more types of movement of the patient, such as gross body movement (e.g., motion) of the patient, patient posture, movements associated with the beating of the heart, or coughing, rales, or other respiration abnormalities. One or more of the parameters monitored by IMD 10 (e.g., impedance, EGM) may fluctuate in response to changes in one or more such types of movement. For example, changes in parameter values sometimes may be attributable to increased patient motion (e.g., exercise or other physical motion as compared to immobility) or to changes in patient posture, and not necessarily to changes in a medical condition. Additionally, external device 12 may compare times when external device is moving to times when accelerometer signals of IMD 10 indicate patient 4 is moving, as times when both external device 12 is moving and patient 4 are moving may be indicative of external device 12 being within communication range of IMD 10 and times when one of external device 12 or patient 4 is moving and the other is not moving may be indicative of external device 12 and IMD 10 being out of communication range of each other. While IMD 10 is described as including various components, in some examples IMDs which may implement techniques of this disclosure may include other components, such as a therapy component that is configured to deliver therapy to patient 4, including, but not limited to a pulse generator for delivering electrical stimulation (e.g., pacing pulses, defibrillation shocks, etc.), a motor for providing left ventricle assist device (LVAD) therapy, or a drug pump and reservoir for delivering drugs to patient 4.

Figure 3:
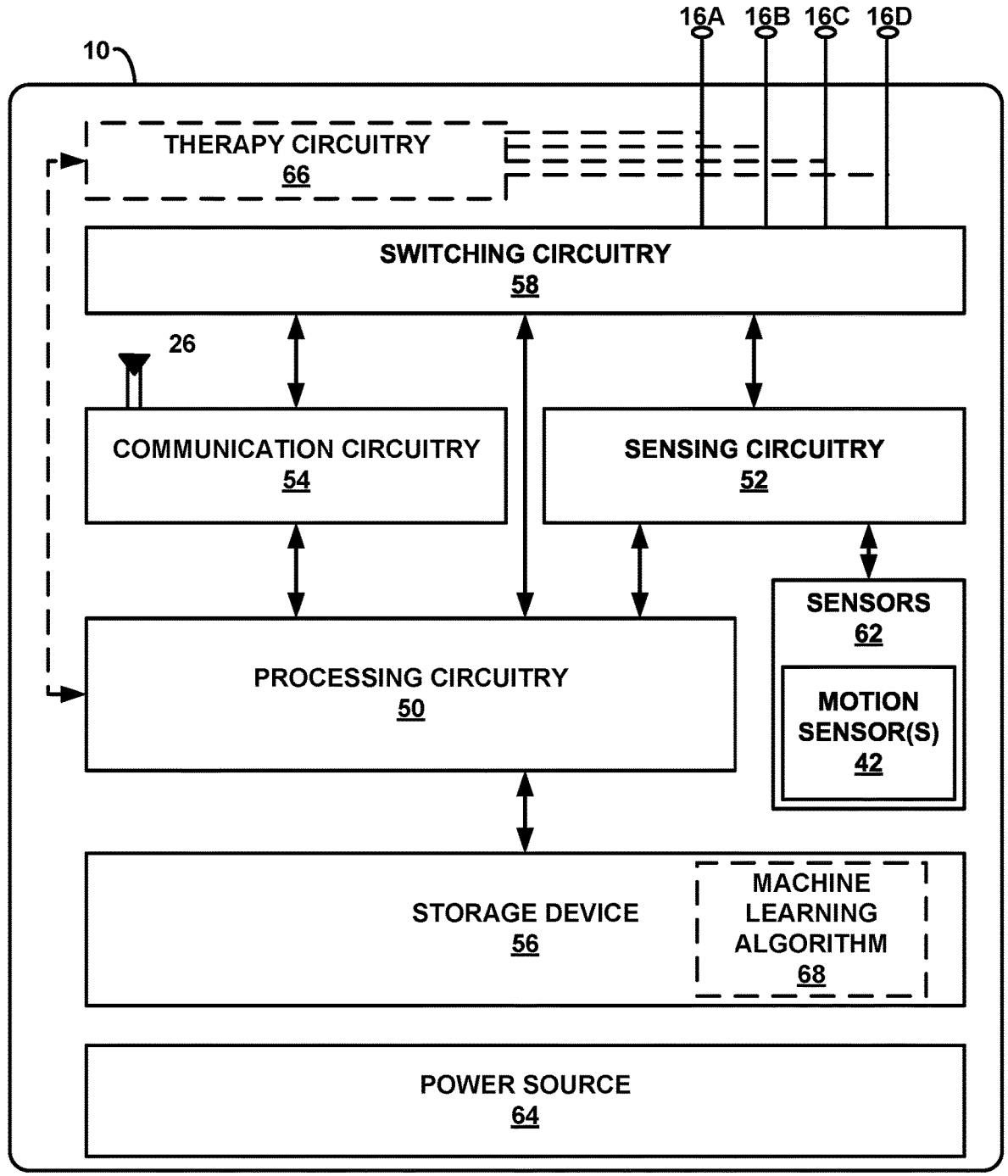
FIG. 3 is a functional block diagram illustrating an example configuration of the IMD of FIGS. 1 and 2, in accordance with one or more techniques described herein.

FIG. 3 is a functional block diagram illustrating an example configuration of IMD 10 of FIGS. 1 and 2, in accordance with one or more techniques described herein. In the illustrated example, IMD 10 includes electrodes 16, antenna 26, processing circuitry 50, sensing circuitry 52, communication circuitry 54, storage device 56, switching circuitry 58, sensors 62 including motion sensor(s) 42, and power source 64. Although not illustrated in FIG. 3, sensors 62 may include one or more light detectors.

Processing circuitry 50 may include fixed function circuitry and/or programmable processing circuitry. Processing circuitry 50 may include any one or more of a microprocessor, a controller, a DSP, an ASIC, an FPGA, or equivalent discrete or analog logic circuitry. In some examples, processing circuitry 50 may include multiple components, such as any combination of one or more microprocessors, one or more controllers, one or more DSPs, one or more ASICs, or one or more FPGAs, as well as other discrete or integrated logic circuitry. The functions attributed to processing circuitry 50 herein may be embodied as software, firmware, hardware or any combination thereof.

Sensing circuitry 52 and communication circuitry 54 may be selectively coupled to electrodes 16A-16D via switching circuitry 58, as controlled by processing circuitry 50. Sensing circuitry 52 may monitor signals from electrodes 16A-16D in order to monitor electrical activity of heart (e.g., to produce an EGM), and/or subcutaneous tissue impedance, the impedance being indicative of at least some aspects respiratory patterns of patient 4 and the EMG being indicative of at least some aspects cardiac patterns of patient 4. In some examples, a subcutaneous impedance signal collected by IMD 10 may indicate a respiratory rate and/or a respiratory intensity of patient 4 and an EMG collected by IMD 10 may indicate a heart rate of patient 4 and an atrial fibrillation (AF) burden of patient 4. Sensing circuitry 52 also may monitor signals from sensors 62, which may include motion sensor(s) 42, such as accelerometer(s), and any additional sensors, such as light detectors or pressure sensors, that may be positioned on IMD 10. In some examples, sensing circuitry 52 may include one or more filters and amplifiers for filtering and amplifying signals received from one or more of electrodes 16A-16D and/or motion sensor(s) 42.

Communication circuitry 54 may include any suitable hardware, firmware, software or any combination thereof for communicating with another device, such as external device 12 or another IMD or sensor, such as a pressure sensing device. Under the control of processing circuitry 50, communication circuitry 54 may receive downlink telemetry from, as well as transmit uplink telemetry to, external device 12 or another device with the aid of an internal or external antenna, e.g., antenna 26. In some examples, communication circuitry 54 may transmit advertisements for communication intended to be received by external device 12. Such advertisements may be regularly sent at predetermined intervals. In some examples, communication circuitry 54 may receive a do not advertise message from external device 12 which may inform processing circuitry 50 to control communication circuitry 54 not to advertise during certain time periods, such as when successful communication between IMD 10 and external device 12 is less likely than other time periods, as determined by external device 12. For example, external device 12 may determine that IMD 10 and external device 12 are normally not in communication range, on an edge of communication range, or patient 4 is likely to walk away from external device 12 (e.g., the likelihood of successful communications is relatively low) between 1 μm and 5 μm and that transmitting advertisements during that timeframe is a waste of battery power. The do not advertise message may, therefore, include the time from 1 μm to 5 μm and instruct IMD 10 to begin to refrain from transmitting advertisements at 1 μm and to restart transmitting advertisements for communication at 5 μm. In some examples, the time periods may be associated with particular day(s) of the week. For example, external device 12 may determine that on Saturdays from 8am to 11 am the likelihood of successful communications is relatively low, but on weekdays from 8am to 11 am the likelihood of successful communications is relatively high.

In some examples, rather than communication circuitry 54 receiving a do not advertise message from external device 12, communication circuitry 54 may receive a message from external device 12 to increase the time between advertising intervals (hereinafter referred to as an "advertising interval message"). For example, external device 12 may transmit the advertising interval message to IMD 10 to increase the time between advertising intervals from every 3 minutes to every 15 minutes. In this manner, IMD 10 may save battery charge by not advertising for communication as often as IMD 10 otherwise would. External device 12 may later transmit another message to IMD 10 to return to the original predetermined advertising intervals, for example, when the likelihood of successful communication is relatively higher.

In some examples, communication circuitry 54 receives the do not advertise message or the advertising interval message during a time period when successful communication is more likely between external device 12 and IMD 10 (e.g., external device 12 and IMD 10 are more likely to be within, and remain within, communication range than other times). In some examples, communication circuitry 54 receives the do not advertise message or the advertising interval message as part of a larger communication session. For example, the communication session may include communication circuitry 54 receiving other instructions from external device 12 or communication circuitry 54 transmitting sensor data to external device 12. In addition, processing circuitry 50 may communicate, via communication circuitry 54, with a networked computing device via an external device (e.g., external device 12) and a computer network, such as the Medtronic CareLink® Network developed by Medtronic, plc, of Dublin, Ireland.

A clinician, patient 4, or other user may retrieve data from IMD 10 using external device 12, or by using another local or networked computing device configured to communicate with processing circuitry 50 via communication circuitry 54. The clinician may also program parameters of IMD 10 using external device 12 or another local or networked computing device.

In some examples, storage device 56 includes computer-readable instructions that, when executed by processing circuitry 50, cause IMD 10 and processing circuitry 50 to perform various functions attributed to IMD 10 and processing circuitry 50 herein. Storage device 56 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Power source 64 is configured to deliver operating power to the components of IMD 10. Power source 64 may include a battery and a power generation circuit to produce the operating power. In some examples, the battery is non-rechargeable. In some examples, the battery is rechargeable to allow extended operation. In some examples, recharging is accomplished through proximal inductive interaction between an external charger and an inductive charging coil within external device 12. Power source 64 may include any one or more of a plurality of different battery types, such as nickel cadmium batteries and lithium ion batteries. A non-rechargeable battery may be selected to last for several years, while a rechargeable battery may be inductively charged from an external device, e.g., on a daily or weekly basis.

In some examples, IMD 10 may optionally include therapy delivery circuitry 66 (shown in dashed lines). Therapy delivery circuitry 66 may include a pulse generator for delivering electrical stimulation (e.g., pacing pulses, defibrillation shocks, etc.), a motor for providing left ventricle assist device (LVAD) therapy, a drug pump and reservoir for delivering drugs to patient 4, or any other circuitry configured to deliver therapy to patient 4. In some examples, therapy circuitry 66 may be configured to deliver therapy through electrodes 16A-16D or through other electrodes (not shown).

In some examples, IMD 10 may optionally include machine learning algorithm 68. Machine learning algorithm 68 may be similar to machine learning algorithm 92 described in detail with respect to FIG. 5 later in this disclosure.

Figure 4A:
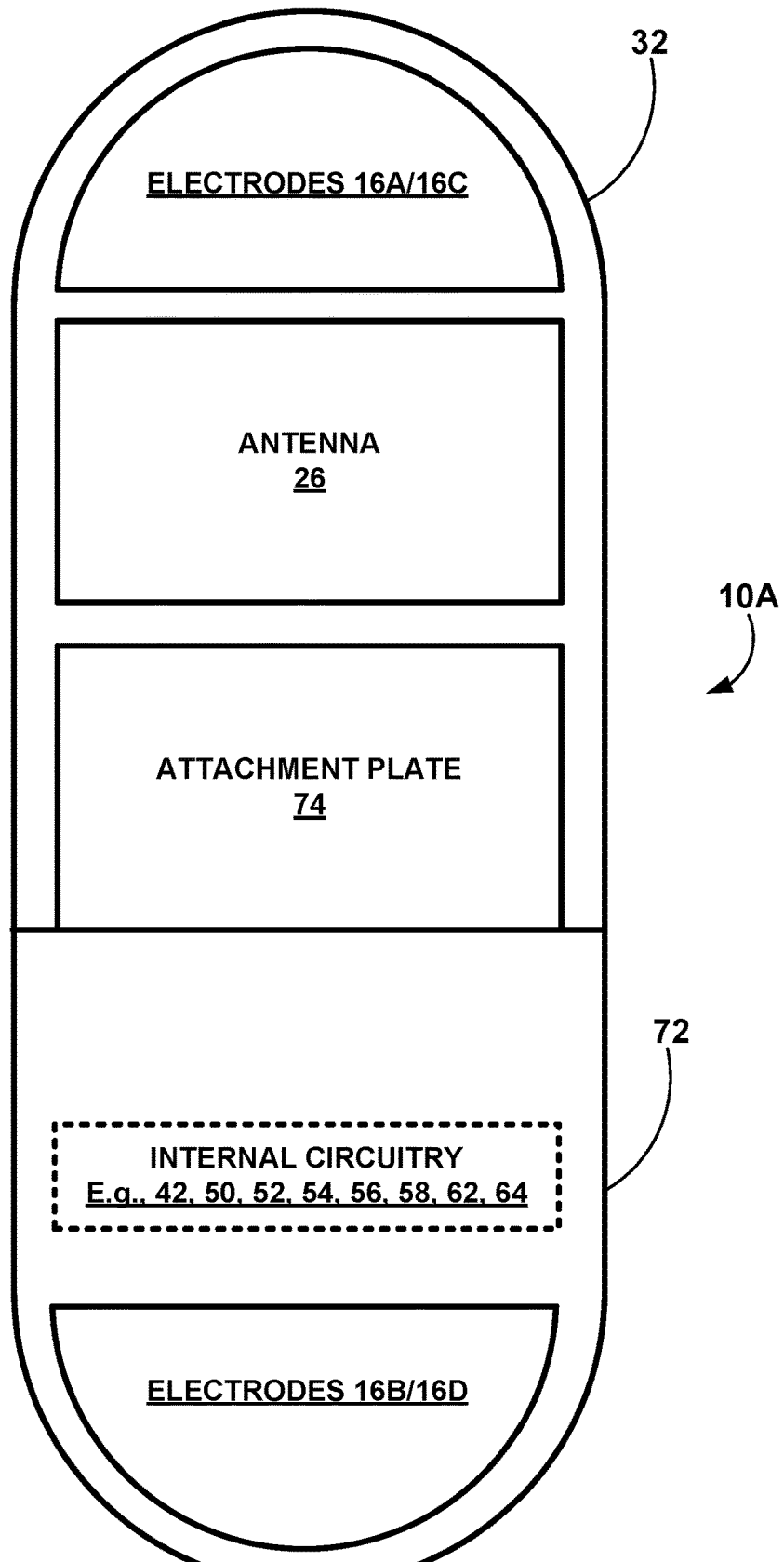
FIGS. 4A and 4B illustrate two additional example IMDs that may be substantially similar to the IMD of FIGS. 1-3, but which may include one or more additional features, in accordance with one or more techniques described herein.
Figure 4B:
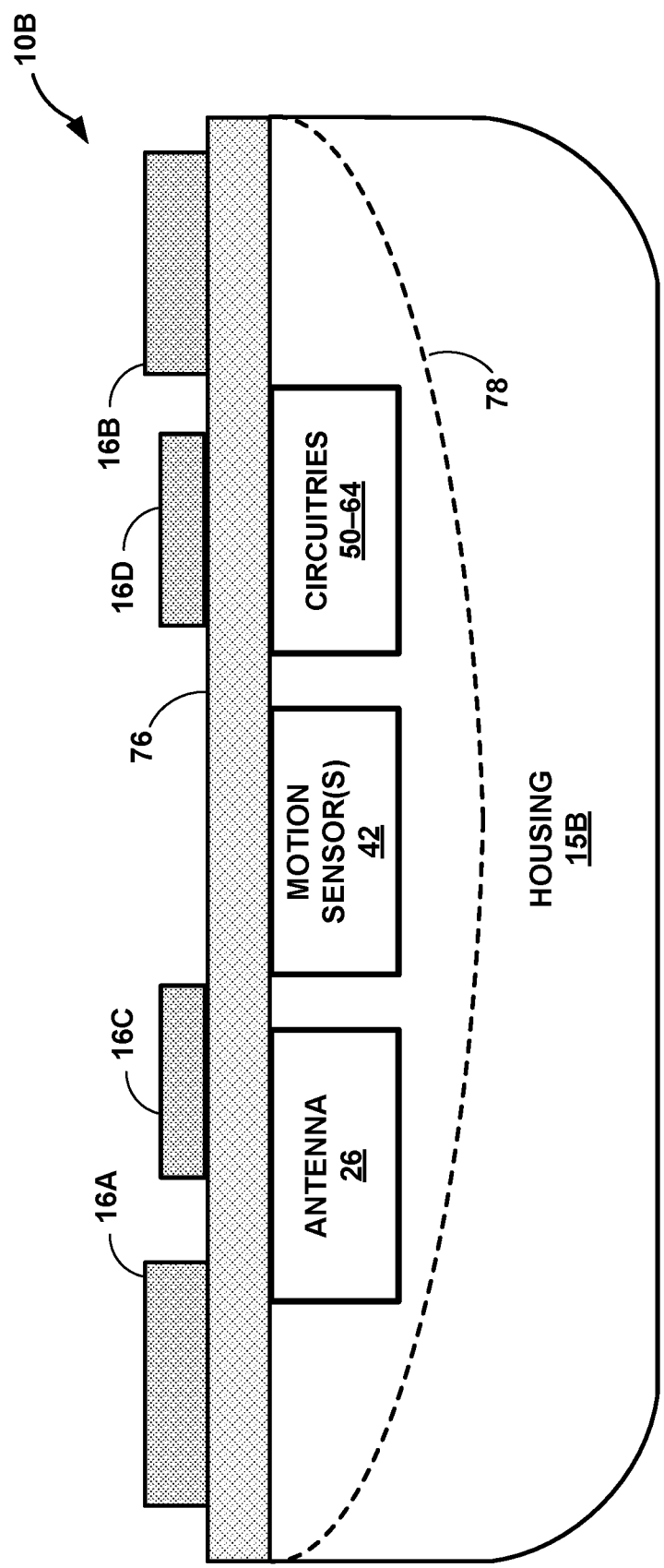

FIGS. 4A and 4B illustrate two additional example IMDs that may be substantially similar to IMD 10 of FIGS. 1-3, but which may include one or more additional features, in accordance with one or more techniques described herein. The components of FIGS. 4A and 4B may not necessarily be drawn to scale, but instead may be enlarged to show detail. FIG. 4A is a block diagram of a top view of an example configuration of an IMD 10A. FIG. 4B is a block diagram of a side view of example IMD 10B, which may include an insulative layer as described below.

FIG. 4A is a conceptual drawing illustrating another example IMD 10A that may be substantially similar to IMD 10 of FIG. 1. In addition to the components illustrated in FIGS. 1-3, the example of IMD 10 illustrated in FIG. 4A also may include a body portion 72 and an attachment plate 74. Attachment plate 74 may be configured to mechanically couple header assembly 32 to body portion 72 of IMD 10A. Body portion 72 of IMD 10A may be configured to house one or more of the internal components of IMD 10 illustrated in FIG. 3, such as one or more of processing circuitry 50, sensing circuitry 52, communication circuitry 54, storage device 56, switching circuitry 58, internal components of sensors 62, and power source 64. In some examples, body portion 72 may be formed of one or more of titanium, ceramic, or any other suitable biocompatible materials.

FIG. 4B is a conceptual drawing illustrating another example IMD 10B that may include components substantially similar to IMD 10 of FIG. 1. In addition to the components illustrated in FIGS. 1-3, the example of IMD 10B illustrated in FIG. 4B also may include a wafer-scale insulative cover 76, which may help insulate electrical signals passing between electrodes 16A-16D and processing circuitry 50. In some examples, insulative cover 76 may be positioned over an open housing 15B to form the housing for the components of IMD 10B. One or more components of IMD 10B (e.g., antenna 26, light emitter 38, processing circuitry 50, sensing circuitry 52, communication circuitry 54, switching circuitry 58, and/or power source 64) may be formed on a bottom side of insulative cover 76, such as by using flip-chip technology. Insulative cover 76 may be flipped onto a housing 15B. When flipped and placed onto housing 15B, the components of IMD 10B formed on the bottom side of insulative cover 76 may be positioned in a gap 78 defined by housing 15B.

Insulative cover 76 may be configured so as not to interfere with the operation of IMD 10B. For example, one or more of electrodes 16A-16D may be formed or placed above or on top of insulative cover 76, and electrically connected to switching circuitry 58 through one or more vias (not shown) formed through insulative cover 76. Insulative cover 76 may be formed of sapphire (i.e., corundum), glass, parylene, and/or any other suitable insulating material.

Figure 5:
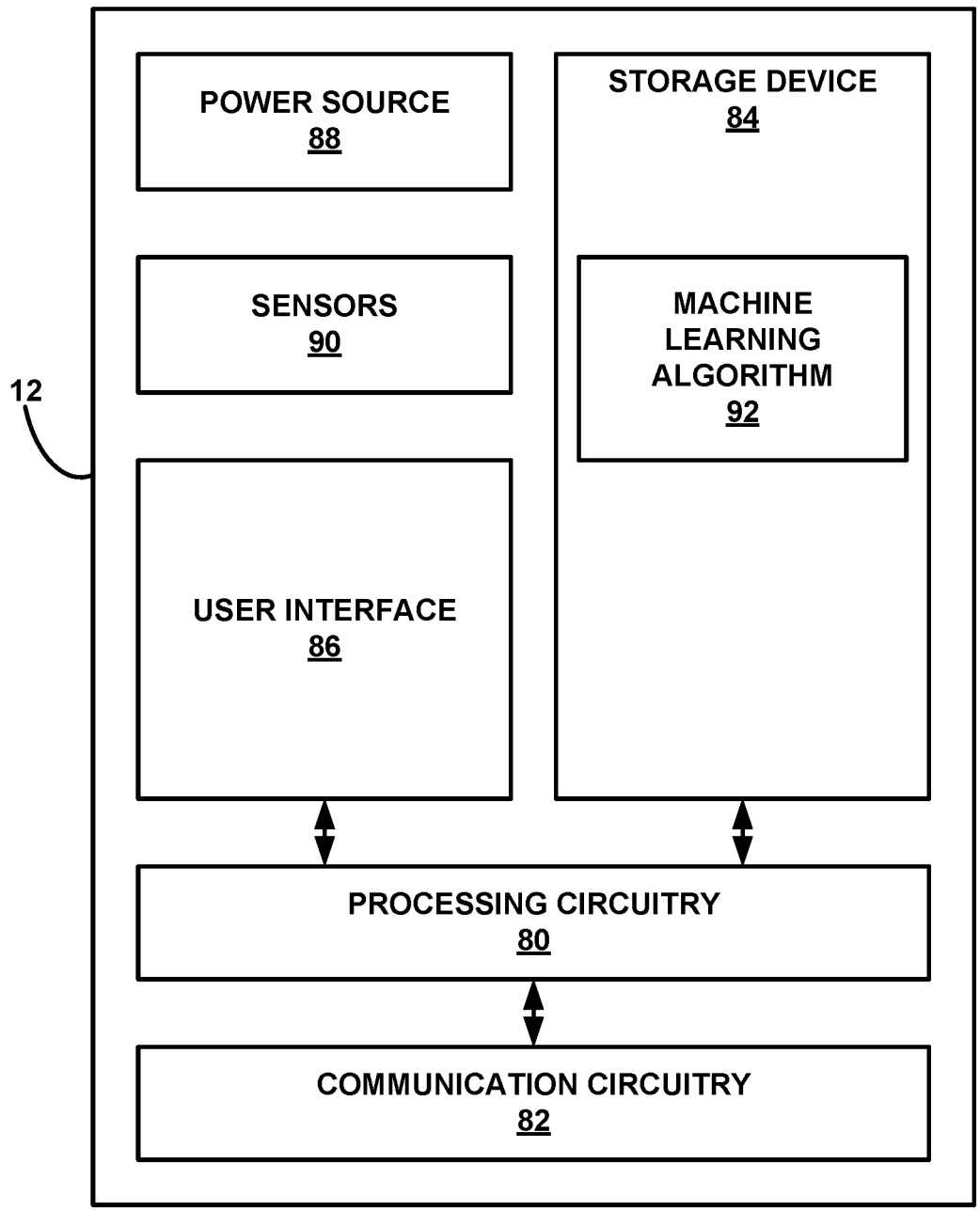
FIG. 5 is a block diagram illustrating an example configuration of components of the external device of FIG. 1, in accordance with one or more techniques of this disclosure.

FIG. 5 is a block diagram illustrating an example configuration of components of external device 12, in accordance with one or more techniques of this disclosure. In the example of FIG. 5, external device 12 includes processing circuitry 80, communication circuitry 82, storage device 84, user interface 86, power source 88, and sensors 90. In some examples, external device 12 is a mobile device, such as a smart phone.

Processing circuitry 80, in one example, may include one or more processors that are configured to implement functionality and/or process instructions for execution within external device 12. For example, processing circuitry 80 may be capable of processing instructions stored in storage device 84. Processing circuitry 80 may include, for example, microprocessors, DSPs, ASICs, FPGAs, or equivalent discrete or integrated logic circuitry, or a combination of any of the foregoing devices or circuitry. Accordingly, processing circuitry 80 may include any suitable structure, whether in hardware, software, firmware, or any combination thereof, to perform the functions ascribed herein to processing circuitry 80. Processing circuitry 80 may be configured to determine a first time period when a likelihood of successful communications with IMD 10 is higher than a second time period based on sensed parameters. Processing circuitry 80 may be configured to control communication circuitry 82 to communicate with IMD 10 during the first time period and refrain from communicating with IMD 10 during the second time period.

Communication circuitry 82 may include any suitable hardware, firmware, software or any combination thereof for communicating with another device, such as IMD 10. Under the control of processing circuitry 80, communication circuitry 82 may receive downlink telemetry from, as well as transmit uplink telemetry to, IMD 10, or another device. For example, communication circuitry 82 may be configured to sense an advertisement for communication from communication circuitry 54 (FIG. 3) of IMD 10. The advertisement (or lack thereof) may be a parameter associated with external device 12 that may be indicative of whether a communication session between external device 12 and IMD 10 may be successful. Communication circuitry 82 may also be configured to sense a beacon from, for example, a wireless access point, which may be associated with a geo-location. The geo-location of external device 12 may be a parameter associated with external device 12.

Communication circuitry 82 may be configured to transmit a do not advertise message to IMD 10. The do not advertise message may include an instruction to IMD 10 not to advertise for communication during a time period when successful communication may be less likely than other time periods. Communication circuitry 82 may be configured to transmit the do not advertise message during a time period when successful communication may be more likely than other time periods. In some examples, communication circuitry 82 may be configured to transmit the do not advertise message as part of another communication session. For example, communication circuitry 82 may transmit the do not advertise during a communication session with IMD 10 in which at least one of sensor data from IMD 10 is received by communication circuitry 82 or additional messages (such as instructions to change sensing electrodes) are transmitted by communication circuitry 82 to IMD 10. In some examples, the do not advertise message includes a time at which IMD 10 restart transmitting advertisements for communication. In this manner, external device 12 may also save power as external device 12 may save resources as external device 12 knows IMD 10 will not be advertising for communication until the time at which IMD 10 restarts transmitting advertisements for communication and external device 12 may not scan for advertisements until that time.

Storage device 84 may be configured to store information within external device 12 during operation. Storage device 84 may include a computer-readable storage medium or computer-readable storage device. In some examples, storage device 84 includes one or more of a short-term memory or a long-term memory. Storage device 84 may include, for example, RAM, dynamic random access memories (DRAM), static random access memories (SRAM), magnetic discs, optical discs, flash memories, or forms of electrically programmable memories (EPROM) or EEPROM. In some examples, storage device 84 is used to store data indicative of instructions for execution by processing circuitry 80. Storage device 84 may be used by software or applications running on external device 12 to temporarily store information during program execution.

Storage device 84 may include machine learning algorithm 92. In some examples, machine learning algorithm 92 may be a convolutional neural network algorithm. Processing circuitry 80 may use machine learning algorithm 92 to determine patterns in behavior of patient 4 relating to external device 12. For example, processing circuitry 80 may input sensed parameters associated with external device 12 which may be indicative of a physical proximity of external device 12 to patient 4 (and thereby to IMD 10). For example, processing circuitry 80 may represent the sensed parameters as points on a graph. Processing circuitry 80 may use the points to form multiple shaped tensors, which are mathematical generalizations of the points. Processing circuitry 80 may use the multiple shaped tensors to train machine learning algorithm 92. In some examples, processing circuitry 80 may train machine learning algorithm 92 over a predetermined period of time. This predetermined period of time may be long enough such that the habits of patient 4 may be established, but not so long that the habits may no longer be valid. For example, if patient 4 visited their children one week and was back in their home the next week in an in-home routine, the habits from the previous week may no longer be valid in the next week. In some examples, processing circuitry 80 may train machine learning algorithm 92 regularly, such as every few days. In some examples, if processing circuitry 80 determines a more rapid shift than every few days in the behavior of patient 4 such that processing circuitry 80 determines that the output of machine learning algorithm 92 falls below a lower outcome confidence threshold, processing circuitry 80 may initiate training of machine learning algorithm based on the output of machine learning algorithm 92 falling below the lower outcome confidence threshold. In some examples, processing circuitry may provide machine learning algorithm 92 with input indicative of successful and/or unsuccessful communications and/or a number of advertisements for communication from IMD 10 detected by external device 12 over a predetermined period of time, e.g., one week, or as determined by machine learning algorithm 92 and machine learning algorithm 92 may determine an appropriate time for retraining. By retraining machine learning algorithm 92, machine learning algorithm 92 may adapt to changes and improve the precision of machine learning algorithm 92.

When external device 12 is in close physical proximity to patient 4, external device 12 and IMB 10 may be in communication range of each other. When external device 12 is not in close physical proximity to patient 4, external device 12 and IMB 10 may not be in communication range of each other. By determining patterns of behavior of patient 4 with respect to external device 12, external device 12 may control communication circuitry 82 in a manner which may improve the battery life of IMD 10. In some examples, processing circuitry 80 may update machine learning algorithm 92 over time based on changes in the sensed parameters over time. While the sensed parameters are primarily discussed herein as being used by machine learning algorithm to determine physical proximity of external device 12 to IMD 10, and consequently the likelihood that a communication session will be successful between external device 12 and IMD 10, in some examples, some or all of the sensed parameters may be used by machine learning algorithm 92 or another machine learning algorithm to determine other patterns, such as a lifestyle of patient 4, which may be indicative of the health of patient 4.

Sensors 90 may be configured to sense one or more parameters associated with external device 12. For example, sensors 90 may include a motion sensor configured to sense movement of external device 12 which may be a parameter associated with external device 12. Sensors 90 may include one or more camera sensors or ambient light sensors which may be configured to sense an ambient light level. An ambient light level may be a parameter associated with external device 12. For example, sensors 90 may include one or more microphones which may be configured to sense an ambient sound level or whether patient 4 is speaking, which may be a parameter associated with external device 12. For example, sensors 90 may include a sensor configured to sense a geo-location of external device 12 which may be a parameter associated with external device 12. For example, sensors 90 may include a sensor configured to sense an axis position of external device 12 which may be a parameter associated with external device 12.

Data exchanged between external device 12 and IMD 10 may include operational parameters. External device 12 may transmit data including computer readable instructions which, when implemented by IMD 10, may control IMD 10 to change one or more operational parameters and/or export collected data. For example, processing circuitry 80 may transmit an instruction to 1 MB 10, via communication circuitry 82, which requests 1 MB 10 to export collected data (e.g., sensed data by sensor(s) 62 or sensing circuitry 52) to external device 12. In turn, external device 12 may receive the collected data from 1 MB 10 and store the collected data in storage device 84. Additionally, or alternatively, processing circuitry 80 may export instructions to IMD 10 requesting IMD 10 to update electrode combinations for stimulation or sensing.

A user, such as a clinician or patient 4, may interact with external device 12 through user interface 86. User interface 86 includes a display (not shown), such as an LCD or LED display or other type of screen, with which processing circuitry 80 may present information related to IMD 10 (e.g., EGM signals obtained from at least one electrode or at least one electrode combination). In addition, user interface 86 may include an input mechanism to receive input from the user. The input mechanisms may include, for example, any one or more of buttons, a keypad (e.g., an alphanumeric keypad), a peripheral pointing device, a touch screen, or another input mechanism that allows the user to navigate through user interfaces presented by processing circuitry 80 of external device 12 and provide input. In other examples, user interface 86 also includes audio circuitry for providing audible notifications, instructions or other sounds to patient 4, receiving voice commands from patient 4, or both. In some examples, user interface 86 or processing circuitry 80 may sense whether patient 4 is interacting with user interface 86. The interaction with user interface 86, or lack thereof, may be a parameter associated with external device 12 and may be indicative of whether or not a communication session between external device 12 and IMD 10 is likely to be successful. Storage device 84 may include instructions for operating user interface 86 and for managing power source 88.

Power source 88 is configured to deliver operating power to the components of external device 12. Power source 88 may include a battery and a power generation circuit to produce the operating power. In some examples, the battery is rechargeable to allow extended operation. Recharging may be accomplished by electrically coupling power source 88 to a cradle or plug that is connected to an alternating current (AC) outlet. In addition, recharging may be accomplished through proximal inductive interaction between an external charger and an inductive charging coil within external device 12. In other examples, traditional batteries (e.g., nickel cadmium or lithium ion batteries) may be used. In addition, external device 12 may be directly coupled to an alternating current outlet to operate.

Figure 6:
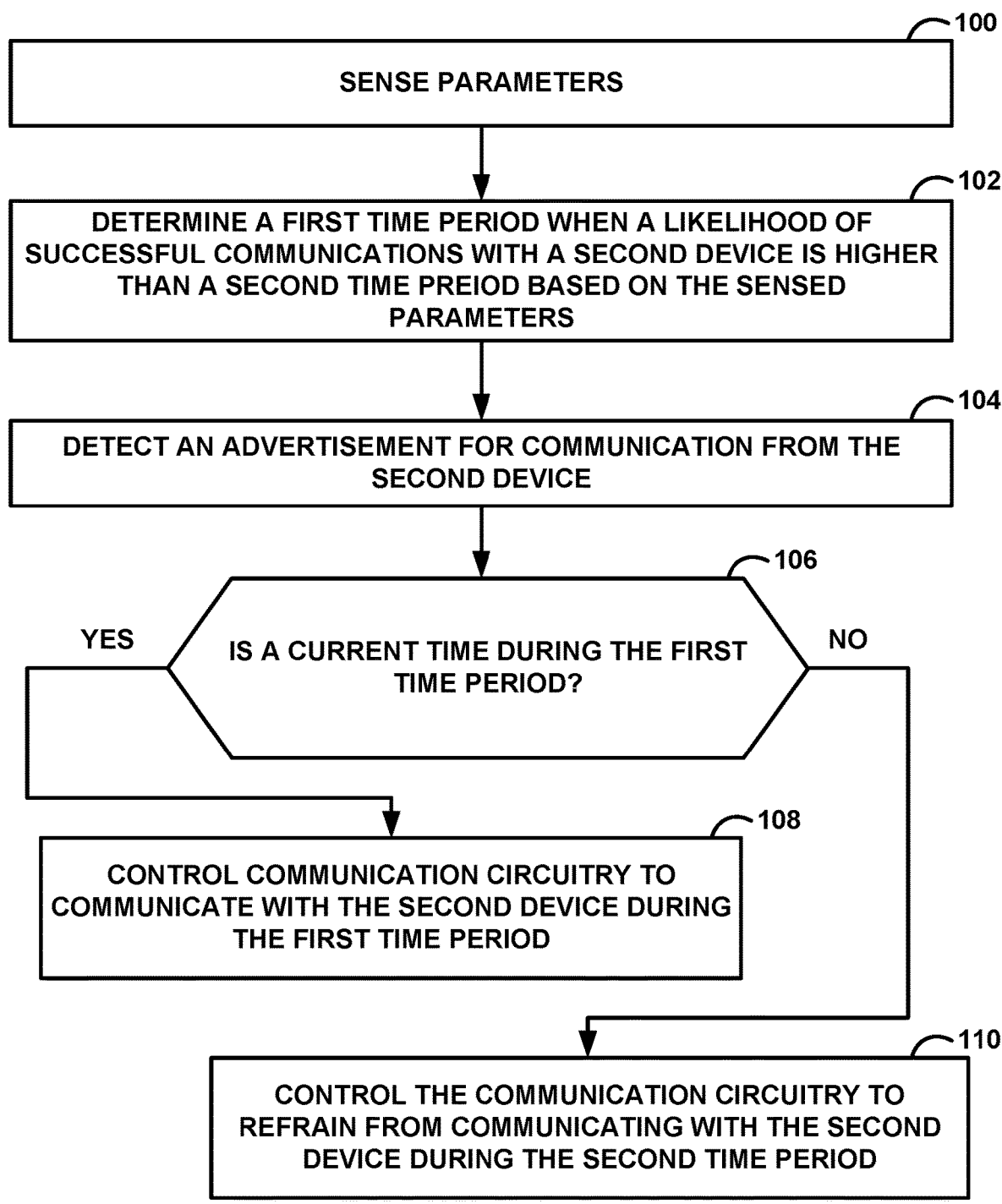
FIG. 6 is a flow diagram illustrating an example operation for improving power consumption of an IMD, in accordance with one or more techniques of this disclosure.

FIG. 6 is a flow diagram illustrating an example operation for improving power consumption of an IMD, in accordance with one or more techniques of this disclosure. FIG. 6 is described with respect to IMD 10, and external device 12 of FIGS. 1-5. However, the techniques of FIG. 6 may be performed by different components of IMD 10, or external device 12, or by additional or alternative medical device systems.

A first device (e.g., external device 12) may sense parameters (100). For example, sensors 90 may sense at least one of an advertisement for communication from IMD 10, user interaction with user interface 86 of external device 12, movement of external device 12, ambient light levels, ambient sound levels, geo-location of external device 12, or axis positioning of external device 12. In examples where the parameters are sensed by IMD 10 rather than, or in addition to, parameters sensed by external device 12, communication circuitry 54 (FIG. 3) may sense received communications from external device 12 and/or motion sensor 42 (FIG. 3) may sense motion of IMD 10.

The first device may determine a first time period when a likelihood of successful communications with a second device (e.g., IMD 10) is higher than a second time period based on sensed parameters (102). For example, sensors 90, user interface 86, and/or communication circuitry 82 may sense parameters associated with the first device (e.g., external device 12). Processing circuitry 80 may employ machine learning techniques, such as a convolutional neural network algorithm, to determine a time period when external device 12 is more likely to be within, and remain within, close proximity to IMD 10. By being within, and remaining within close proximity of IMD 10, external device 12 may be more likely to have successful communications with IMD 10 as external device 12 and IMD 10 may be within communication range of each other during the entire communication session. The determination of the time period when external device 12 is more likely to be within, and remain within, close proximity to IMD 10 may be based on the sensed parameters. For example, the sensed parameters may include at least one of an advertisement for communication from IMD 10, user interaction with user interface 86 of external device 12, movement of external device 12, ambient light levels, ambient sound levels, geo-location of external device 12, or axis positioning of external device 12. In examples where the parameters are sensed by IMD 10 rather than, or in addition to, parameters sensed by external device 12, communication circuitry 54 may sense received communications from external device 12 and/or motion sensor 42 may sense motion of IMD 10.

The first device may detect an advertisement for communication from the second device (104). For example, communication circuitry 82 may receive an advertisement for communication from communication circuitry 54 of IMD 10.

The first device may determine whether a current time is during the first period (106). For example, processing circuitry 80 may compare a current time to the first time period to determine whether the current time is during the first time period.

If the current time is during the first time period (the "YES" path from block 106), the first device may control communication circuitry to communicate with the second device during the first time period (108). For example, processing circuitry 80 may control communication circuitry 82 to communicate with IMD 10 during the first time period.

If the current time is not during the first time period (e.g., the current time is during the second time period) (the "NO" path from block 106) the first device may control communication circuitry to refrain from communicating with the second device during the second time period (110). For example, processing circuitry 80 may control communication circuitry 82 to refrain from initiating a communication session with IMD 10 in response to the advertisement during the second time period. In another example, processing circuitry 80 may control communication circuitry 82 to transmit a do not advertise message to IMD 10, wherein the do not advertise message includes an instruction to IMD 10 not to advertise for communication during the second time period. In another example, processing circuitry 80 may control communication circuitry 82 to transmit an advertising interval message to IMD 10, wherein the advertising interval message includes an instruction to IMD 10 increase the time between advertising intervals.

In some examples, processing circuitry 50 (FIG. 3) of IMD 10 may disregard the do not advertise message or the advertising interval message if processing circuitry 50 determines a critical event has occurred. For example, storage device 56 may store a list of critical events or a list of parameters indicative of critical events. If IMD 10 senses parameters indicative of a critical event, processing circuitry 50 may control communication circuitry 54 to advertise for communication regardless of whether IMD 10 received a do not advertise message or an advertising interval message. In this manner, IMD 10 may transmit an alert, a message, or sensed parameters to external device 12 indicative of the occurrence of the critical event. Example, critical events may include a dangerous heart rhythm (e.g., ventricular tachycardia or ventricular fibrillation), myocardial infarction, or the like.

In some examples, communication circuitry 82 transmits the do not advertise message or the advertising interval message during the first time period. In some examples, communication circuitry 82 transmits the do not advertise message or the advertising interval message during a communication session with IMD 10 in which at least one of sensor data from the implantable medical device is received by communication circuitry 82 (e.g., data sensed by sensing circuitry 52 or sensor(s) 62 (FIG. 3) or additional messages (e.g., instructions to change sensing electrodes) are transmitted by the communication circuitry 82 to IMD 10. In this manner, the do not advertise message or the advertising interval message may be part of communication session that includes another purpose, such as changing IMD 10 parameters or downloading sensed data from IMD 10 to external device 12. In some examples, the do not advertise message further includes an instruction to IMD 10 of a time at which IMD 10 is to restart transmitting advertisements for communication, such as the beginning of the first time period.

In some examples, determining the first time period includes using a machine learning algorithm. For example, processing circuitry 80 may use machine learning algorithm 92 to determine the first time period. In some examples, machine learning algorithm 92 is a convolutional neural network. In some examples, external device 12 is a mobile phone, such as a smart phone.

By determining when a communication session between external device 12 and IMD 10 may be more likely to be successful and controlling communication circuitry 82 to only communicate with IMD 10 during times when the communication session is more likely to be successful than other times, the battery life of IMD 10 may be extended, as IMD 10 may avoid repeated transmission of the same data and, in some examples, avoid advertising for communication during times when the communication session is less likely to be successful. In the case where the battery of IMD 10 is non-rechargeable, this may lengthen the life of IMD 10 and extend the time before patient 4 undergoes replacement surgery. In the case where the battery of IMD 10 is rechargeable, this may lengthen the recharge interval which may be beneficial to patient 4 as it may offer patient 4 more flexibility in daily living.

Figure 7:
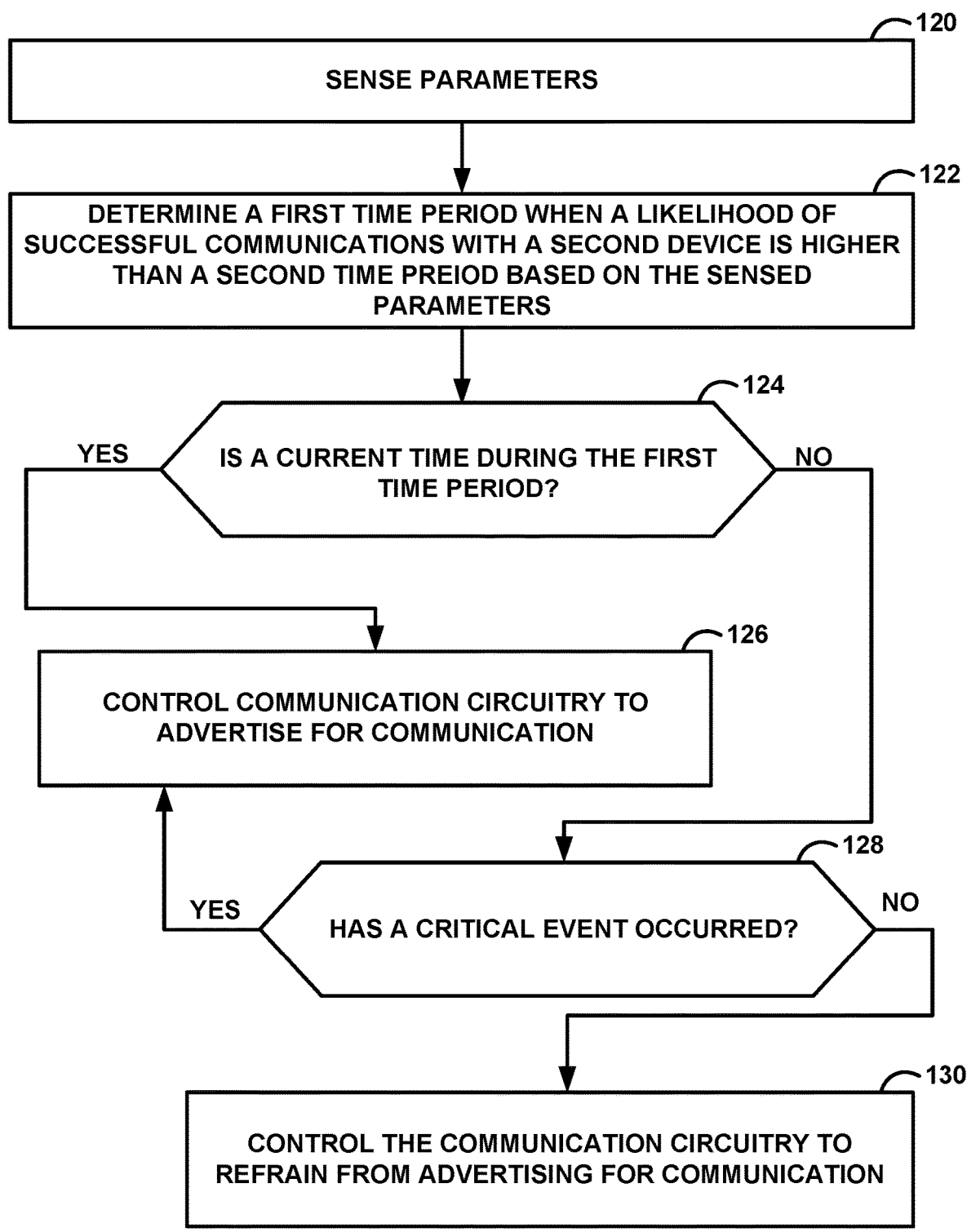
FIG. 7 is a flow diagram illustrating another example operation for improving power consumption of an IMD, in accordance with one or more techniques of this disclosure.

FIG. 7 is a flow diagram illustrating another example operation for improving power consumption of an IMD, in accordance with one or more techniques of this disclosure. FIG. 7 is described with respect to IMD 10, and external device 12 of FIGS. 1-5. However, the techniques of FIG. 7 may be performed by different components of IMD 10, or external device 12, or by additional or alternative medical device systems.

A first device (e.g., IMD 10) may sense parameters (120). For example, communication circuitry 54 (FIG. 3) may sense received communications from external device 12 and/or motion sensor 42 (FIG. 3) may sense motion of IMD 10. In examples where the parameters are sensed by external device 12 rather than, or in addition to, parameters sensed by IMD 10, sensors 90 may sense at least one of an advertisement for communication from IMD 10, user interaction with user interface 86 of external device 12, movement of external device 12, ambient light levels, ambient sound levels, geo-location of external device 12, or axis positioning of external device 12.

The first device may determine a first time period when a likelihood of successful communications with a second device (e.g., external device 12) is higher than a second time period based on sensed parameters (122). For example, processing circuitry 50 may determine the first time period and the second time period based on sensed parameters. Processing circuitry 50 may employ machine learning techniques, such as a convolutional neural network algorithm, to determine a time period when external device 12 is more likely to be within, and remain within, close proximity to IMD 10. By being within, and remaining within close proximity of IMD 10, external device 12 may be more likely to have successful communications with IMD 10 as external device 12 and IMD 10 may be within communication range of each other during the entire communication session. The determination of the time period when external device 12 is more likely to be within, and remain within, close proximity to IMD 10 may be based on the sensed parameters. For example, the sensed parameters may include received communications from external device 12 and/or motion of IMD 10.

The first device may determine whether a current time is during the first period (124). For example, processing circuitry 50 may compare a current time to the first time period to determine whether the current time is during the first time period.

If the current time is during the first time period (the "YES" path from block 124), the first device may control communication circuitry to advertise for communication (126). For example, processing circuitry 50 may control communication circuitry 54 to advertise for communication with external device 12.

If the current time is not during the first time period (e.g., the current time is during the second time period) (the "NO" path from block 124), the first device may determine whether a critical event has occurred (128). For example, sensing circuitry 52 and/or sensors 62 (both of FIG. 3) of IMD 10 may monitor sensed physiological parameters of patient 4. Storage device 56 may store a list of critical events or a list of parameters indicative of critical events. Processing circuitry 50 may compare the sensed physiological parameters to the list of parameters indicative of critical events or may classify the sensed physiological parameters as an event and compare the event to the list of critical events to determine whether a critical event has occurred.

If the first device determines a critical event has occurred (the "YES" path from block 128), the first device may control communication circuitry to advertise for communication (126). For example, processing circuitry 50 may control communication circuitry 54 to advertise for communication regardless of whether IMD 10 received a do not advertise message in response to determining that a critical event has occurred. In such a case, external device 12 may be configured to establish communication with IMD 10 in response to receiving the advertisement from IMD 10 even though the advertisement is sent during the second time period. In this manner, IMD 10 may transmit an alert, a message, or sensed parameters to external device 12 indicative of the occurrence of the critical event. Example, critical events may include a dangerous heart rhythm, myocardial infarction, or the like.

If the first device determines a critical event has not occurred (the "NO" path from block 128), the first device may control communication circuitry to refrain from advertising for communication (126). Although not shown, the first device may then return to box 120 or box 124.

In some examples, determining the first time period includes using a machine learning algorithm. For example, processing circuitry 50 may use machine learning algorithm 68 to determine the first time period. In some examples, machine learning algorithm 68 is a convolutional neural network.

By determining when a communication session between external device 12 and IMD 10 may be more likely to be successful and controlling communication circuitry 54 to only advertise for communication with external device 12 during times when the communication session is more likely to be successful than other times, or when a critical event has been detected, the battery life of IMD 10 may be extended while still providing for communication with external device 12 when critical events have occurred. IMD 10 may avoid repeated transmission of the same data and avoid advertising for communication during times when the communication session is less likely to be successful. In the case where the battery of IMD 10 is non-rechargeable, this may lengthen the life of IMD 10 and extend the time before patient 4 undergoes replacement surgery. In the case where the battery of IMD 10 is rechargeable, this may lengthen the recharge interval which may be beneficial to patient 4 as it may offer patient 4 more flexibility in daily living.

The techniques described in this disclosure may be implemented, at least in part, in hardware, software, firmware, or any combination thereof. For example, various aspects of the techniques may be implemented within one or more microprocessors, DSPs, ASICs, FPGAs, or any other equivalent integrated or discrete logic QRS circuitry, as well as any combinations of such components, embodied in external devices, such as physician or patient programmers, stimulators, or other devices. The terms "processor" and "processing circuitry" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as RAM, DRAM, SRAM, magnetic discs, optical discs, flash memories, or forms of EPROM or EEPROM. The instructions may be executed to support one or more aspects of the functionality described in this disclosure.

In addition, in some aspects, the functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components. Also, the techniques could be fully implemented in one or more circuits or logic elements. The techniques of this disclosure may be implemented in a wide variety of devices or apparatuses, including an IMD, an external programmer, a combination of an IMD and external programmer, an integrated circuit (IC) or a set of ICs, and/or discrete electrical circuitry, residing in an IMD and/or external programmer.

This disclosure includes the following non-limiting examples.

Example 1. A first device comprising: communication circuitry configured to communicate with a second device; one or more sensors configured to sense parameters associated with the first device; and processing circuitry configured to: determine a first time period when a likelihood of successful communications with the second device is higher than a second time period based on the sensed parameters; and control the communication circuitry to communicate with the second device during the first time period and refrain from communicating with the second device during the second time period.

Example 2. The device of example 1, wherein the processing circuitry is configured to determine the first time period via a machine learning algorithm.

Example 3. The first device of example 2, wherein the machine learning algorithm comprises a convolutional neural network.

Example 4. The first device of any of examples 1-3, wherein the sensed parameters comprise at least one of an advertisement for communication from the second device, user interaction with a user interface of the first device, movement of the first device, ambient light levels, ambient sound levels, geo-location of the first device, or axis positioning of the first device.

Example 5. The first device of examples 1-4, wherein the communication circuitry is further configured to receive an advertisement for communication from the second device and wherein the processing circuitry is configured to control the communication circuitry to refrain from initiating a communication session with the second device in response to the advertisement during the second time period.

Example 6. The first device of examples 1-5, wherein the processing circuitry is further configured to control the communication circuitry to transmit a do not advertise message to the second device, wherein the do not advertise message includes an instruction to the second device not to advertise for communication during the second time period.

Example 7. The first device of example 6, wherein the processing circuitry is configured to control the communication circuitry to transmit the do not advertise message during the first time period.

Example 8. The first device of example 7, wherein the processing circuitry is configured to control the communication circuitry to transmit the do not advertise message during a communication session with the second device in which at least one of sensor data from the second device is received by the communication circuitry or additional messages are transmitted by the communication circuitry to the second device.

Example 9. The first device of any of examples 6-8, wherein the do not advertise message further comprises an instruction to the second device of a time at which the second device is to restart transmitting advertisements for communication.

Example 10. The first device of any of examples 1-9, wherein the first device comprises a smart phone.

Example 11. The first device of any of examples 1-10, wherein the processing circuitry is further configured to: determine that a battery charge level is below a predetermined charge threshold prior to controlling the communication circuitry to refrain from communicating with the second device during the second time period.

Example 12. A method comprising: determining, by processing circuitry, a first time period when a likelihood of successful communications with a second device is higher than a second time period based on sensed parameters; and controlling, by the processing circuitry, communication circuitry to communicate with the second device during the first time period and refrain from communicating with the second device during the second time period.

Example 13. The method of example 12, determining the first time period comprises using a machine learning algorithm.

Example 14. The method of example 13, wherein the machine learning algorithm comprises a convolutional neural network.

Example 15. The method of any of examples 12-14, wherein the sensed parameters comprise at least one of an advertisement for communication from the second device, user interaction with a user interface of a first device, movement of the first device, ambient light levels, ambient sound levels, geo-location of the first device, or axis positioning of the first device.

Example 16. The method of any of examples 12-15, further comprising: receiving an advertisement for communication from the second device; and refraining from initiating a communication session with the second device in response to the advertisement during the second time period.

Example 17. The method of any of examples 12-16, further comprising transmitting, by the communication circuitry, a do not advertise message to the second device, wherein the do not advertise message includes an instruction to the second device not to advertise for communication during the second time period.

Example 18. The method of example 17, wherein the communication circuitry transmits the do not advertise message during the first time period.

Example 19. The method of example 18, wherein communication circuitry transmits the do not advertise message during a communication session with the second device in which at least one of sensor data from the second device is received by the communication circuitry or additional messages are transmitted by the communication circuitry to the second device.

Example 20. The method of any of examples 17-19, wherein the do not advertise message further comprises an instruction to the second device of a time at which the second device is to restart transmitting advertisements for communication.

Example 21. The first device of any of examples 12-20, wherein the processing circuitry is further configured to: determine that a battery charge level is below a predetermined charge threshold prior to controlling the communication circuitry to refrain from communicating with the second device during the second time period.

Example 22. A non-transitory computer-readable medium comprising instructions for causing one or more processors to: determine a first time period when a likelihood of successful communications with a second device is higher than a second time period based on sensed parameters; and control communication circuitry to communicate with the second device during the first time period and refrain from communicating with the second device during the second time period.

Example 23. A first device comprising: communication circuitry configured to communicate with a second device; one or more sensors configured to sense parameters associated with the first device; and processing circuitry configured to: determine a first time period when a likelihood of successful communications with the second device is higher than a second time period based on the sensed parameters; and control the communication circuitry to advertise for communication during the first time period.

Example 24. The first device of example 23, wherein the processing circuitry is further configured to: determine whether a critical event has occurred; and based on the critical event having occurred, control the communication circuitry to advertise for communication during the second time period.

Example 25. The first device of example 23 or example 24, wherein the processing circuitry is configured to determine the first time period via a machine learning algorithm.

Example 26. The first device of example 25, wherein the machine learning algorithm comprises a convolutional neural network.

Example 27. The first device of any of examples 23-26, wherein the sensed parameters comprise at least one of communications from the second device or movement of the first device.

Example 28. A method comprising: determining, by processing circuitry, a first time period when a likelihood of successful communications with the second device is higher than a second time period based on the sensed parameters; and controlling the communication circuitry to advertise for communication during the first time period.

Example 29. The method of example 28, further comprising: determining whether a critical event has occurred; and based on the critical event having occurred, controlling the communication circuitry to advertise for communication during the second time period.

Example 30. The method of example 28 or example 29, wherein determining the first time period comprises using a machine learning algorithm.

Example 31. The method of example 30, wherein the machine learning algorithm comprises a convolutional neural network.

Example 32. The method of any of examples 28-31, wherein the sensed parameters comprise at least one of communications from the second device or movement of the first device.

Example 33. A non-transitory computer-readable medium comprising instructions for causing one or more processors to: determine a first time period when a likelihood of successful communications with the second device is higher than a second time period based on the sensed parameters; and control the communication circuitry to advertise for communication during the first time period.

Various examples have been described. These and other examples are within the scope of the following claims.

What is claimed is:

1. A first device comprising:
 communication circuitry configured to communicate with a second device;
 one or more sensors configured to sense parameters associated with the first device; and
 processing circuitry configured to:
  determine a first time period when a likelihood of successful communications with the second device is higher than a second time period based on the sensed parameters, the sensed parameters being indicative of a likelihood that the first device is within a proximity of the second device, and the first time period being different than the second time period;
  control the communication circuitry to transmit a do not advertise message to the second device, wherein the do not advertise message includes an instruction to the second device not to advertise for communication during the second time period; and
  not receive, by the communication circuitry from the second device and in response to the do not advertise message, an advertisement from the second device during the second time period; and
  control the communication circuitry to communicate with the second device during the first time period and refrain from communicating with the second device during the second time period.

2. The first device of claim 1, wherein the processing circuitry is configured to determine the first time period via a machine learning algorithm.

3. The first device of claim 2, wherein the machine learning algorithm comprises a convolutional neural network.

4. The first device of claim 1, wherein the sensed parameters comprise at least one of an advertisement for communication from the second device, user interaction with a user interface of the first device, movement of the first device, ambient light levels, ambient sound levels, geo-location of the first device, or axis positioning of the first device.

5. The first device of claim 1, wherein the processing circuitry is configured to control the communication circuitry to transmit the do not advertise message during the first time period.

6. The first device of claim 5, wherein the processing circuitry is configured to control the communication circuitry to transmit the do not advertise message during a communication session with the second device in which at least one of sensor data from the second device is received by the communication circuitry or additional messages are transmitted by the communication circuitry to the second device.

7. The first device of claim 1, wherein the do not advertise message further comprises an instruction to the second device of a time at which the second device is to restart transmitting advertisements for communication, and wherein the processing circuitry is further configured to receive, by the communication circuitry from the second device and in response to the do not advertise message, an advertisement from the second device at or after the time at which the second device is to restart transmitting advertisements for communication.

8. The first device of claim 1, wherein the processing circuitry is further configured to determine that a battery charge level is below a predetermined charge threshold, and wherein controlling the communication circuitry to refrain from communicating with the second device during the second time period is based on the battery charge level being below the predetermined charge threshold.

9. A method comprising:
 determining, by processing circuitry, a first time period when a likelihood of successful communications with a second device is higher than a second time period based on sensed parameters, the sensed parameters being indicative of a likelihood that a first device is within a proximity of the second device, and the first time period being different than the second time period;
 transmitting, by communication circuitry, a do not advertise message to the second device, wherein the do not advertise message includes an instruction to the second device not to advertise for communication during the second time period; and
 not receiving, by the communication circuitry from the second device and in response to the do not advertise message, an advertisement from the second device during the second time period; and
 controlling, by the processing circuitry, communication circuitry to communicate with the second device during the first time period and refrain from communicating with the second device during the second time period.

10. The method of claim 9, determining the first time period comprises using a machine learning algorithm.

11. The method of claim 10, wherein the machine learning algorithm comprises a convolutional neural network.

12. The method of claim 9, wherein the sensed parameters comprise at least one of an advertisement for communication from the second device, user interaction with a user interface of a first device, movement of the first device, ambient light levels, ambient sound levels, geo-location of the first device, or axis positioning of the first device.

13. The method of claim 9, wherein the communication circuitry transmits the do not advertise message during the first time period.

14. The method of claim 13, wherein communication circuitry transmits the do not advertise message during a communication session with the second device in which at least one of sensor data from the second device is received by the communication circuitry or additional messages are transmitted by the communication circuitry to the second device.

15. The method of claim 9, wherein the do not advertise message further comprises an instruction to the second device of a time at which the second device is to restart transmitting advertisements for communication, and wherein the method further comprises receiving, by the communication circuitry from the second device and in response to the do not advertise message, an advertisement from the second device at or after the time at which the second device is to restart transmitting advertisements for communication.

16. Non-transitory computer-readable media comprising instructions for causing one or more processors to:
- determine a first time period when a likelihood of successful communications with a second device is higher than a second time period based on sensed parameters, the sensed parameters being indicative of a likelihood that a first device is within a proximity of the second device, and the first time period being different than the second time period;
- control communication circuitry to transmit a do not advertise message to the second device, wherein the do not advertise message includes an instruction to the second device not to advertise for communication during the second time period; and
- not receive, via the communication circuitry from the second device and in response to the do not advertise message, an advertisement from the second device during the second time period; and
- control the communication circuitry to communicate with the second device during the first time period and refrain from communicating with the second device during the second time period.

* * * * *